United States Patent
Bita et al.

(10) Patent No.: US 7,864,403 B2
(45) Date of Patent: Jan. 4, 2011

(54) POST-RELEASE ADJUSTMENT OF INTERFEROMETRIC MODULATOR REFLECTIVITY

(75) Inventors: Ion Bita, San Jose, CA (US); Jeffrey B. Sampsell, Pueblo West, CO (US)

(73) Assignee: Qualcomm Mems Technologies, Inc., San Diego, CA (US)

(*) Notice: Subject to any disclaimer, the term of this patent is extended or adjusted under 35 U.S.C. 154(b) by 1 day.

(21) Appl. No.: 12/413,452

(22) Filed: Mar. 27, 2009

(65) Prior Publication Data

US 2010/0245977 A1 Sep. 30, 2010

(51) Int. Cl.
G02B 26/00 (2006.01)
(52) U.S. Cl. ................. 359/292; 359/291
(58) Field of Classification Search ........... 359/290, 359/291, 292, 295
See application file for complete search history.

(56) References Cited

U.S. PATENT DOCUMENTS

| | | | |
|---|---|---|---|
| 4,190,488 A | 2/1980 | Winters | |
| 4,500,171 A | 2/1985 | Penz et al. | |
| 4,519,676 A | 5/1985 | te Velde | |
| 4,560,435 A | 12/1985 | Brown et al. | |
| 4,566,935 A | 1/1986 | Hornbeck | |
| 4,655,554 A | 4/1987 | Armitage | |
| 4,663,181 A | 5/1987 | Murali | |
| 4,710,732 A | 12/1987 | Hornbeck | |
| 4,859,060 A | 8/1989 | Katagiri et al. | |
| 4,880,493 A | 11/1989 | Ashby et al. | |
| 4,900,395 A | 2/1990 | Syverson et al. | |
| 4,954,789 A | 9/1990 | Sampsell | |
| 4,956,619 A | 9/1990 | Hornbeck | |
| 5,037,173 A | 8/1991 | Sampsell et al. | |
| 5,079,544 A | 1/1992 | DeMond et al. | |
| 5,083,857 A | 1/1992 | Hornbeck | |
| 5,099,353 A | 3/1992 | Hornbeck | |
| 5,124,834 A | 6/1992 | Cusano et al. | |
| 5,214,419 A | 5/1993 | DeMond et al. | |
| 5,214,420 A | 5/1993 | Thompson et al. | |
| 5,216,537 A | 6/1993 | Hornbeck | |
| 5,231,532 A | 7/1993 | Magel et al. | |

(Continued)

FOREIGN PATENT DOCUMENTS

CN 1217470 5/1999

(Continued)

OTHER PUBLICATIONS

Tamaki, et al., "Laser micro-welding of transparent materials by a localized heat accumulation effect using a femtosecond fiber laser at 1558 nm," Optics Express vol. 14, No. 22 Oct. 30, 2006.

(Continued)

Primary Examiner—David N Spector
(74) Attorney, Agent, or Firm—Knobbe Martens Olson & Bear LLP

(57) ABSTRACT

In various embodiments, devices, methods, and systems for adjusting the reflectivity spectrum of a microelectromechanical systems (MEMS) device are described herein. The method comprises depositing a reflectivity modifying layer with the optical cavity of an interferometric modulator, where the reflectivity modifying layer shifts or trims the shape of the interferometric modulator's wavelength reflectivity spectrum relative to the absence of the reflectivity modifying layer.

21 Claims, 17 Drawing Sheets

U.S. PATENT DOCUMENTS

| | | | |
|---|---|---|---|
| 5,272,473 A | 12/1993 | Thompson et al. | |
| 5,293,272 A | 3/1994 | Jannson et al. | |
| 5,312,513 A | 5/1994 | Florence et al. | |
| 5,315,370 A | 5/1994 | Bulow | |
| 5,324,683 A | 6/1994 | Fitch et al. | |
| 5,327,286 A | 7/1994 | Sampsell et al. | |
| 5,345,328 A | 9/1994 | Fritz et al. | |
| 5,381,040 A | 1/1995 | Sun et al. | |
| 5,454,906 A | 10/1995 | Baker et al. | |
| 5,506,597 A | 4/1996 | Thompson et al. | |
| 5,515,076 A | 5/1996 | Thompson et al. | |
| 5,523,803 A | 6/1996 | Urbanus et al. | |
| 5,563,398 A | 10/1996 | Sampsell | |
| 5,583,688 A | 12/1996 | Hornbeck | |
| 5,629,790 A | 5/1997 | Neukermans et al. | |
| 5,638,946 A | 6/1997 | Zavracky | |
| 5,646,768 A | 7/1997 | Kaeriyama | |
| 5,706,022 A | 1/1998 | Hato | |
| 5,719,068 A | 2/1998 | Suzawa et al. | |
| 5,726,480 A | 3/1998 | Pister | |
| 5,784,212 A | 7/1998 | Hornbeck | |
| 5,822,110 A | 10/1998 | Dabbaj | |
| 5,825,528 A | 10/1998 | Goossen | |
| 5,835,255 A | 11/1998 | Miles | |
| 5,961,848 A | 10/1999 | Jacquet et al. | |
| 5,967,163 A | 10/1999 | Pan et al. | |
| 5,986,796 A | 11/1999 | Miles | |
| 6,008,123 A | 12/1999 | Kook et al. | |
| 6,031,653 A | 2/2000 | Wang | |
| 6,040,937 A | 3/2000 | Miles | |
| 6,158,156 A | 12/2000 | Patrick | |
| 6,165,890 A | 12/2000 | Kohl et al. | |
| 6,204,080 B1 | 3/2001 | Hwang | |
| 6,215,221 B1 | 4/2001 | Cabuz et al. | |
| 6,219,015 B1 | 4/2001 | Bloom et al. | |
| 6,242,707 B1 | 6/2001 | Mody et al. | |
| 6,243,149 B1 | 6/2001 | Swanson et al. | |
| 6,275,220 B1 | 8/2001 | Nitta | |
| 6,288,472 B1 | 9/2001 | Cabuz et al. | |
| 6,288,824 B1 | 9/2001 | Kastalsky et al. | |
| 6,297,072 B1 | 10/2001 | Tilmans et al. | |
| 6,335,224 B1 | 1/2002 | Peterson | |
| 6,359,673 B1 | 3/2002 | Stephenson | |
| 6,377,233 B2 | 4/2002 | Colgan et al. | |
| 6,399,257 B1 | 6/2002 | Shirota et al. | |
| 6,407,851 B1 | 6/2002 | Islam et al. | |
| 6,438,282 B1 | 8/2002 | Takeda et al. | |
| 6,447,126 B1 | 9/2002 | Hornbeck | |
| 6,448,622 B1 | 9/2002 | Franke et al. | |
| 6,465,320 B1 | 10/2002 | McNeil et al. | |
| 6,466,358 B2 | 10/2002 | Tew | |
| 6,549,338 B1 | 4/2003 | Wolverton et al. | |
| 6,574,033 B1 | 6/2003 | Chui et al. | |
| 6,589,625 B1 | 7/2003 | Kothari et al. | |
| 6,600,201 B2 | 7/2003 | Hartwell et al. | |
| 6,602,791 B2 | 8/2003 | Ouellet et al. | |
| 6,618,187 B2 | 9/2003 | Pilossof | |
| 6,624,944 B1 | 9/2003 | Wallace et al. | |
| 6,635,919 B1 | 10/2003 | Melendez et al. | |
| 6,643,069 B2 | 11/2003 | Dewald | |
| 6,650,455 B2 | 11/2003 | Miles | |
| 6,671,149 B1 | 12/2003 | Chea et al. | |
| 6,674,090 B1 | 1/2004 | Chua et al. | |
| 6,674,562 B1 | 1/2004 | Miles | |
| 6,679,995 B1 | 1/2004 | Banjac et al. | |
| 6,713,235 B1 | 3/2004 | Ide et al. | |
| 6,720,267 B1 | 4/2004 | Chen et al. | |
| 6,743,570 B2 | 6/2004 | Harnett et al. | |
| 6,747,800 B1 | 6/2004 | Lin | |
| 6,756,317 B2 | 6/2004 | Sniegowski et al. | |
| 6,778,306 B2 | 8/2004 | Sniegowski et al. | |
| 6,782,166 B1 | 8/2004 | Grote et al. | |
| 6,794,119 B2 | 9/2004 | Miles | |
| 6,806,110 B2 | 10/2004 | Lester et al. | |
| 6,806,557 B2 | 10/2004 | Ding | |
| 6,809,788 B2 | 10/2004 | Yamada et al. | |
| 6,811,267 B1 | 11/2004 | Allen et al. | |
| 6,812,482 B2 | 11/2004 | Fleming et al. | |
| 6,819,469 B1 | 11/2004 | Koba | |
| 6,859,301 B1 | 2/2005 | Islam et al. | |
| 6,861,277 B1 | 3/2005 | Monroe et al. | |
| 6,867,896 B2 | 3/2005 | Miles | |
| 6,870,581 B2 | 3/2005 | Li et al. | |
| 6,870,654 B2 | 3/2005 | Lin et al. | |
| 6,912,082 B1 | 6/2005 | Lu et al. | |
| 6,947,200 B2 | 9/2005 | Huibers | |
| 6,953,702 B2 | 10/2005 | Miller et al. | |
| 6,959,990 B2 | 11/2005 | Penn | |
| 6,972,891 B2 | 12/2005 | Patel et al. | |
| 6,982,820 B2 | 1/2006 | Tsai | |
| 6,995,890 B2 | 2/2006 | Lin | |
| 6,999,225 B2 | 2/2006 | Lin | |
| 6,999,236 B2 | 2/2006 | Lin | |
| 7,008,812 B1 | 3/2006 | Carley | |
| 7,012,726 B1 | 3/2006 | Miles | |
| 7,027,202 B1 | 4/2006 | Hunter et al. | |
| 7,041,224 B2 | 5/2006 | Patel et al. | |
| 7,041,571 B2 | 5/2006 | Strane | |
| 7,049,164 B2 | 5/2006 | Bruner | |
| 7,064,880 B2 | 6/2006 | Mushika | |
| 7,078,293 B2 | 7/2006 | Lin et al. | |
| 7,110,158 B2 | 9/2006 | Miles | |
| 7,119,945 B2 | 10/2006 | Cummings et al. | |
| 7,123,216 B1 | 10/2006 | Miles | |
| 7,126,741 B2 | 10/2006 | Wagner et al. | |
| 7,142,346 B2 | 11/2006 | Chui et al. | |
| 7,145,213 B1 | 12/2006 | Ebel | |
| 7,172,915 B2 | 2/2007 | Lin et al. | |
| 7,184,202 B2 | 2/2007 | Miles et al. | |
| 7,198,973 B2 | 4/2007 | Lin et al. | |
| 7,221,495 B2 | 5/2007 | Miles et al. | |
| 7,256,107 B2 | 8/2007 | Takeuchi et al. | |
| 7,256,922 B2 | 8/2007 | Chui et al. | |
| 7,259,865 B2 | 8/2007 | Cummings et al. | |
| 7,291,921 B2 | 11/2007 | Lin | |
| 7,321,457 B2 | 1/2008 | Heald | |
| 7,327,510 B2 | 2/2008 | Cummings et al. | |
| 7,349,136 B2 | 3/2008 | Chui | |
| 7,405,861 B2 | 7/2008 | Floyd | |
| 7,420,728 B2 | 9/2008 | Tung et al. | |
| 7,429,334 B2 | 9/2008 | Tung et al. | |
| 7,446,926 B2 | 11/2008 | Sampsell | |
| 7,450,295 B2 | 11/2008 | Tung et al. | |
| 7,492,502 B2 | 2/2009 | Chui et al. | |
| 7,527,996 B2 | 5/2009 | Luo et al. | |
| 7,534,640 B2 | 5/2009 | Sasagawa et al. | |
| 7,547,565 B2 | 6/2009 | Lin et al. | |
| 7,547,568 B2 | 6/2009 | Chou et al. | |
| 7,556,917 B2 | 7/2009 | Miles | |
| 7,561,321 B2 | 7/2009 | Heald | |
| 7,566,940 B2 | 7/2009 | Sasagawa et al. | |
| 7,569,488 B2 | 8/2009 | Rafanan | |
| 7,570,415 B2 | 8/2009 | Sasagawa | |
| 7,580,172 B2 | 8/2009 | Lewis et al. | |
| 7,587,104 B2 | 9/2009 | Chui | |
| 7,616,369 B2 | 11/2009 | Miles et al. | |
| 7,623,287 B2 | 11/2009 | Sasagawa et al. | |
| 2001/0003487 A1 | 6/2001 | Miles | |
| 2001/0026951 A1 | 10/2001 | Vergani et al. | |
| 2001/0040649 A1 | 11/2001 | Ozaki | |
| 2002/0003400 A1 | 1/2002 | Lee | |
| 2002/0014579 A1 | 2/2002 | Dunfield | |
| 2002/0021485 A1 | 2/2002 | Pilossof | |
| 2002/0027636 A1 | 3/2002 | Yamada | |

| | | |
|---|---|---|
| 2002/0055253 A1 | 5/2002 | Rudhard |
| 2002/0086455 A1 | 7/2002 | Franosch et al. |
| 2002/0110948 A1 | 8/2002 | Huang et al. |
| 2002/0114558 A1 | 8/2002 | Nemirovsky |
| 2002/0117728 A1 | 8/2002 | Brosnihan et al. |
| 2002/0145185 A1 | 10/2002 | Schrauger |
| 2002/0167730 A1 | 11/2002 | Needham et al. |
| 2002/0171610 A1 | 11/2002 | Siwinski et al. |
| 2002/0186209 A1 | 12/2002 | Cok |
| 2003/0003682 A1 | 1/2003 | Moll et al. |
| 2003/0006468 A1 | 1/2003 | Ma et al. |
| 2003/0015936 A1 | 1/2003 | Yoon et al. |
| 2003/0029831 A1 | 2/2003 | Kawase |
| 2003/0053078 A1 | 3/2003 | Missey et al. |
| 2003/0072070 A1 | 4/2003 | Miles |
| 2003/0104693 A1 | 6/2003 | Siegel et al. |
| 2003/0123123 A1 | 7/2003 | Huffman |
| 2003/0123125 A1 | 7/2003 | Little |
| 2003/0132822 A1 | 7/2003 | Ko et al. |
| 2003/0156315 A1 | 8/2003 | Li et al. |
| 2003/0179527 A1 | 9/2003 | Chea |
| 2003/0202264 A1 | 10/2003 | Weber et al. |
| 2003/0202265 A1 | 10/2003 | Reboa et al. |
| 2003/0210851 A1 | 11/2003 | Fu et al. |
| 2004/0028849 A1 | 2/2004 | Stark et al. |
| 2004/0035821 A1 | 2/2004 | Doan et al. |
| 2004/0038513 A1 | 2/2004 | Kohl et al. |
| 2004/0053434 A1 | 3/2004 | Bruner |
| 2004/0061543 A1 | 4/2004 | Nam et al. |
| 2004/0080807 A1 | 4/2004 | Chen et al. |
| 2004/0080832 A1 | 4/2004 | Singh |
| 2004/0100677 A1 | 5/2004 | Huibers et al. |
| 2004/0124483 A1 | 7/2004 | Partridge et al. |
| 2004/0124495 A1 | 7/2004 | Chen et al. |
| 2004/0125281 A1 | 7/2004 | Lin et al. |
| 2004/0125347 A1 | 7/2004 | Patel et al. |
| 2004/0132243 A1 | 7/2004 | Kurosawa et al. |
| 2004/0136076 A1 | 7/2004 | Parviz |
| 2004/0140557 A1 | 7/2004 | Sun et al. |
| 2004/0150936 A1 | 8/2004 | Chea |
| 2004/0191937 A1 | 9/2004 | Patel et al. |
| 2004/0191946 A1 | 9/2004 | Patel et al. |
| 2004/0197526 A1 | 10/2004 | Mehta |
| 2004/0207898 A1 | 10/2004 | Lin et al. |
| 2004/0209195 A1 | 10/2004 | Lin |
| 2004/0217264 A1 | 11/2004 | Wood et al. |
| 2004/0233503 A1 | 11/2004 | Kimura |
| 2005/0014374 A1 | 1/2005 | Partridge et al. |
| 2005/0020089 A1 | 1/2005 | Shi et al. |
| 2005/0030490 A1 | 2/2005 | Huibers |
| 2005/0034822 A1 | 2/2005 | Kim et al. |
| 2005/0042117 A1 | 2/2005 | Lin |
| 2005/0045276 A1 | 3/2005 | Patel et al. |
| 2005/0057442 A1 | 3/2005 | Way |
| 2005/0098840 A1 | 5/2005 | Fuertsch et al. |
| 2005/0118832 A1 | 6/2005 | Korzenski et al. |
| 2005/0124135 A1 | 6/2005 | Ayazi et al. |
| 2005/0170670 A1 | 8/2005 | King et al. |
| 2005/0195462 A1 | 9/2005 | Lin |
| 2006/0066511 A1 | 3/2006 | Chui |
| 2006/0066932 A1 | 3/2006 | Chui |
| 2006/0077503 A1 | 4/2006 | Palmateer et al. |
| 2006/0091824 A1 | 5/2006 | Pate et al. |
| 2006/0094143 A1 | 5/2006 | Haluzak |
| 2006/0257070 A1 | 11/2006 | Lin et al. |
| 2007/0111533 A1 | 5/2007 | Korzenski et al. |
| 2007/0155051 A1 | 7/2007 | Wang et al. |
| 2007/0209437 A1 | 9/2007 | Xue et al. |
| 2007/0249078 A1 | 10/2007 | Tung et al. |
| 2007/0269748 A1 | 11/2007 | Miles |
| 2007/0285761 A1 | 12/2007 | Zhong et al. |
| 2008/0026328 A1 | 1/2008 | Miles |
| 2008/0029481 A1 | 2/2008 | Kothari et al. |
| 2008/0130089 A1 | 6/2008 | Miles |
| 2008/0151352 A1 | 6/2008 | Chung et al. |
| 2008/0158635 A1 | 7/2008 | Hagood et al. |
| 2008/0192328 A1 | 8/2008 | Chui |
| 2008/0226929 A1 | 9/2008 | Chung et al. |
| 2008/0231931 A1 | 9/2008 | Londergan et al. |
| 2008/0268620 A1 | 10/2008 | Floyd |
| 2008/0279498 A1 | 11/2008 | Sampsell et al. |
| 2009/0022884 A1 | 1/2009 | Chui et al. |
| 2009/0059345 A1 | 3/2009 | Tung et al. |
| 2009/0315567 A1 | 12/2009 | Chou et al. |
| 2009/0323168 A1 | 12/2009 | Miles et al. |
| 2010/0149624 A1* | 6/2010 | Kothari ............... 359/291 |
| 2010/0157406 A1* | 6/2010 | Gruhlke et al. ........ 359/238 |

FOREIGN PATENT DOCUMENTS

| | | |
|---|---|---|
| DE | 199 38 072 | 3/2000 |
| EP | 0 035 299 | 9/1983 |
| EP | 0 788 005 | 8/1997 |
| EP | 1 209 738 | 5/2002 |
| EP | 1 452 481 | 9/2004 |
| EP | 1 473 581 | 11/2004 |
| EP | 1 484 635 | 12/2004 |
| JP | 49-004993 | 1/1974 |
| JP | 62-190748 | 8/1987 |
| JP | 01-301180 | 12/1989 |
| JP | 02-068513 | 3/1990 |
| JP | 05275401 | 10/1993 |
| JP | 06-350105 | 12/1994 |
| JP | 07-098326 | 4/1995 |
| JP | 07-060844 | 7/1995 |
| JP | 07-209105 | 8/1995 |
| JP | 07-221323 | 8/1995 |
| JP | 10-020328 | 1/1998 |
| JP | 10-096744 | 4/1998 |
| JP | 10-148644 | 6/1998 |
| JP | 10-209176 | 8/1998 |
| JP | 2000-214035 | 8/2000 |
| JP | 2001-085519 | 3/2001 |
| JP | 2002-287047 | 3/2001 |
| JP | 2002-062505 | 2/2002 |
| JP | 2002-207182 | 7/2002 |
| JP | 2002-243937 | 8/2002 |
| JP | 2002-328313 | 11/2002 |
| JP | 2003-001598 | 1/2003 |
| JP | 2004-106074 | 4/2004 |
| JP | 2004-133281 | 4/2004 |
| WO | WO 91/05284 | 4/1991 |
| WO | WO 92/10925 | 6/1992 |
| WO | WO 01/14248 | 3/2001 |
| WO | WO 01/63657 | 8/2001 |
| WO | WO 02/24570 | 3/2002 |
| WO | WO 03/052506 | 6/2003 |
| WO | WO 2004/055885 | 7/2004 |
| WO | WO 2004/079056 | 9/2004 |
| WO | WO 2005/061378 | 7/2005 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K. et al. "Surface Micromachined Tuneable Interferometer Array," Sensors and Actuators A, Elsevier Sequoia S.A., Lausanne, CH, vol. A43, No. 1/3, May 1, 1994, pp. 17-23.

Butler et al., "An Embedded Overlay Concept for Microsystems Packaging," IEEE Transactions on Advanced Packaging IEEE USA, vol. 23, No. 4, pp. 617-622, XP002379648 (2000).

Hall, Integrated optical inteferometric detection method for micromachined capacitiive acoustic transducers, App. Phy. Let. 80:20(3859-3961) May 20, 2002.

Hoivik et al. 2002. Atomic layer deposition of conformal dielectric and protective coatings for released micro-electromechanical devices, IEEE, pp. 455-458.

Hoivik et al. 2002. Atomic layer deposition (ALD) technology for reliable RF MEMS, IEEE, pp. 1229-1232.

Ibbotson et al., "Comparison of XeF2 and F-atom reactions with Si and SiO2," Applied Physics Letters, vol. 44, No. 12, pp. 1129-1131 (Jun. 1984).

Raley et al., "A Fabry-Perot Microinterferometer for Visible Wavelengths," IEEE Solid-State Sensor and Actuator Workshop, Hilton Head, SC, pp. 170-173 (1992).

Sridharan et al. "Post-packaging Release a New Concept for Surface-Micromachined Devices" Technical Digest, IEEE Solid-State Sensor & Actuator Workshop, New York, NY US Nov. 8, 1998 pp. 225-228.

Williams, et al. Etch Rates for Micromachining Processing. Journal of Microelectromechanical Systems, vol. 5, No. 4, pp. 256-259, (Dec. 1996).

Winters, et al. The etching of silicon with XeF2 vapor. Applied Physics Letters, vol. 34, No. 1, pp. 70-73, (Jan. 1979).

Yao et al., BrF3 dry release technology for large freestanding parylene microstructures and electrostatic actuators, Sensors and Actuators A, vol. 97-98, pp. 771-775, Apr. 2002.

* cited by examiner

POST-RELEASE ADJUSTMENT OF INTERFEROMETRIC MODULATOR REFLECTIVITY

BACKGROUND OF THE INVENTION

1. Technical Field

This application is generally related to microelectromechanical systems (MEMS), and more particularly, to interferometric modulators with cavities and methods for forming the same.

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

In accordance with one embodiment, an optical display system comprising an array of interferometric modulators is provided. Each interferometric modulator comprises a substrate, an optical stack formed on the substrate, and a movable reflective layer. The movable reflective layer has a plurality of etch holes. Support posts extend between the substrate and the movable reflective layer. The space between the movable reflective layer and the optical stack defines a cavity. A reflectivity modifying layer is disposed on at least one surface defining the cavity of at least one but fewer than all interferometric modulators in the array. The cavity and optical stack of the at least one interferometric modulator without the reflectivity modifying layer have a first reflectance spectrum and a first reflectivity peak. The cavity and optical stack of the at least one interferometric modulator with the reflectivity modifying layer have a second reflectance spectrum with a second reflectivity peak.

In accordance with another embodiment, a method for adjusting the reflectivity characteristics of an interferometric modulator is provided. The method comprises depositing a deposition modifying layer over at least one exposed region of the interferometric modulator while forming the interferometric modulator, which comprises an optical stack, a movable reflective layer, and support structures. A sacrificial layer is deposited and removed to form a cavity. A reflectivity modifying layer is deposited after removing the sacrificial layer. The reflectivity modifying layer either preferentially deposits on the deposition modifying layer relative to other surfaces of the interferometric modulator or deposition of the reflectivity modifying layer is inhibited on the deposition modifying layer relative to the other surfaces.

In accordance with another embodiment, a method for improving the color saturation of an interferometric modulator having a reflectivity curve is provided. The method comprises depositing in an optical cavity of a released interferometric modulator a material that absorbs a significant portion of the reflectance spectrum of the released interferometric modulator. The material reduces by at least about 1% to about 5% an area under the reflectivity curve of the interferometric modulator relative to absence of the material.

In accordance with another embodiment, a method of adjusting reflectivity of an optical electromechanical system device is provided. The method comprises providing an array of fabricated optical electromechanical system devices, each of the devices including a preformed cavity. A reflectivity change of at least one of the devices is then determined. The reflectivity of the at least one device is changed without changing the reflectivity of other devices in the array.

In accordance with another embodiment, an interferometric modulator is provided. The interferometric modulator comprises a partially reflective layer and a movable reflective layer. An optical cavity is defined by the partially reflective layer and the movable reflective layer. The movable reflective layer is movable between an actuated position and a relaxed position. A reflectivity modifying layer is disposed on more than one surface of the optical cavity. The reflectivity modifying layer is between about 1 nm and about 10 nm thick and has a refractive index of between about 1.3 and about 6.

In accordance with another embodiment, a method for improving the color saturation of an interferometric modulator is provided. The method comprises depositing in an optical cavity of a released interferometric modulator a material that absorbs a significant portion of the reflectance spectrum of the released interferometric modulator.

DETAILED DESCRIPTION OF SOME PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Certain embodiments of the present invention are directed to methods for depositing a reflectivity modifying layer in an optical cavity of an interferometric modulator after removal of the sacrificial layer. The reflectivity modifying layer is capable of shifting the reflectivity spectrum toward the longer wavelengths, or a red shift, or toward the shorter wavelengths, or blue shift. In certain embodiments, the reflectivity modifying layer comprises materials with sufficient absorbance at the selected wavelength such that it is capable of "trimming" or modifying the shape of the reflectivity spectrum. The reflectivity modifying layer, therefore, allows a skilled artisan to modify the reflectivity spectrum of an interferometric modulator device post-fabrication. In some embodiments, techniques are provided for selective coating of particular surfaces of cavity within a released electromechanical device without coating other surfaces, or selective coating of cavity surfaces of particular electromechanical devices within an array of such electromechanical devices without coating cavity surface of other devices within the array.

Figure 1:
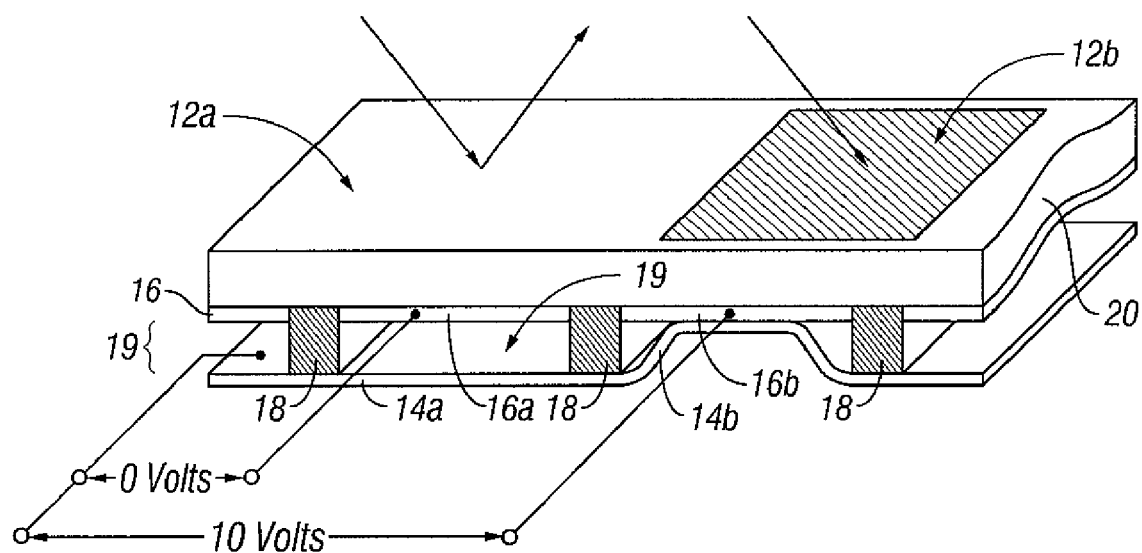
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. While certain embodiments are described herein in terms of the interferometric MEMS display of FIG. 1, principles and advantages taught herein can also be applied to other types of optical electromechanical devices within the scope of the present invention. As applied to an IMOD, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in FIG. 1) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
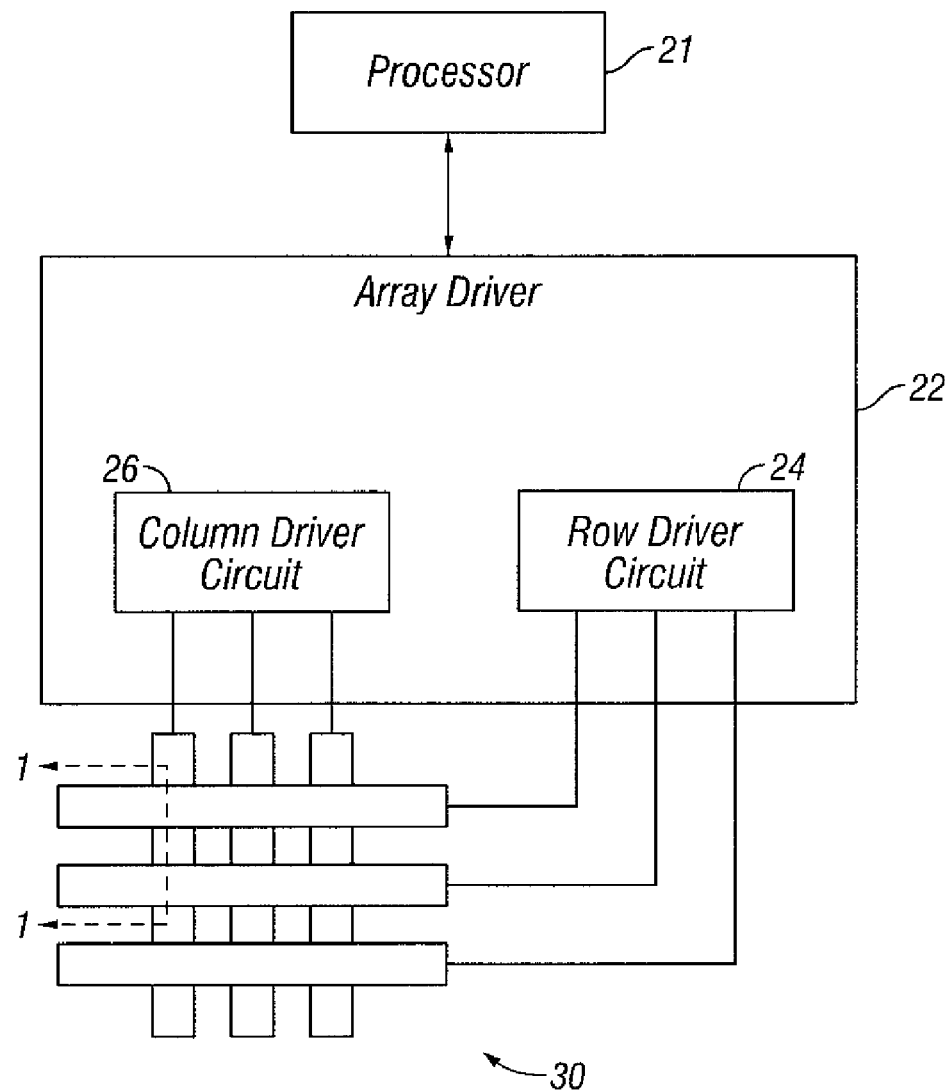
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
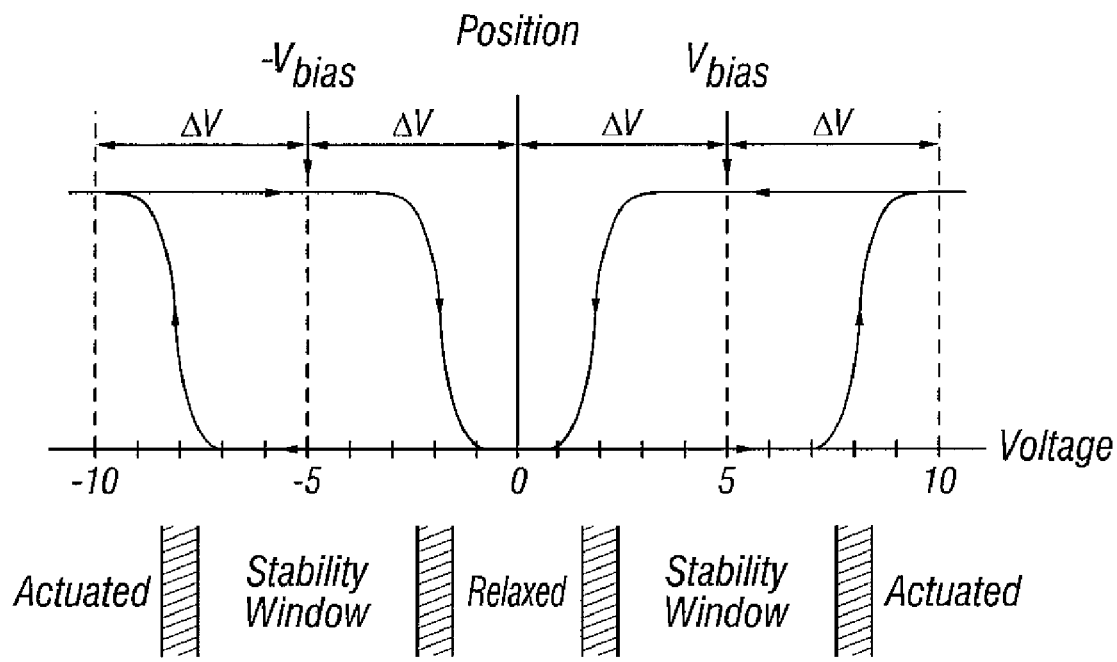
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
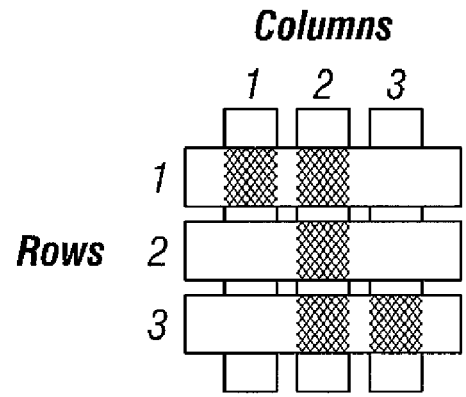
FIG. 5A illustrates one exemplary frame of display data in the 3×3 interferometric modulator display of FIG. 2.
Figure 5B:
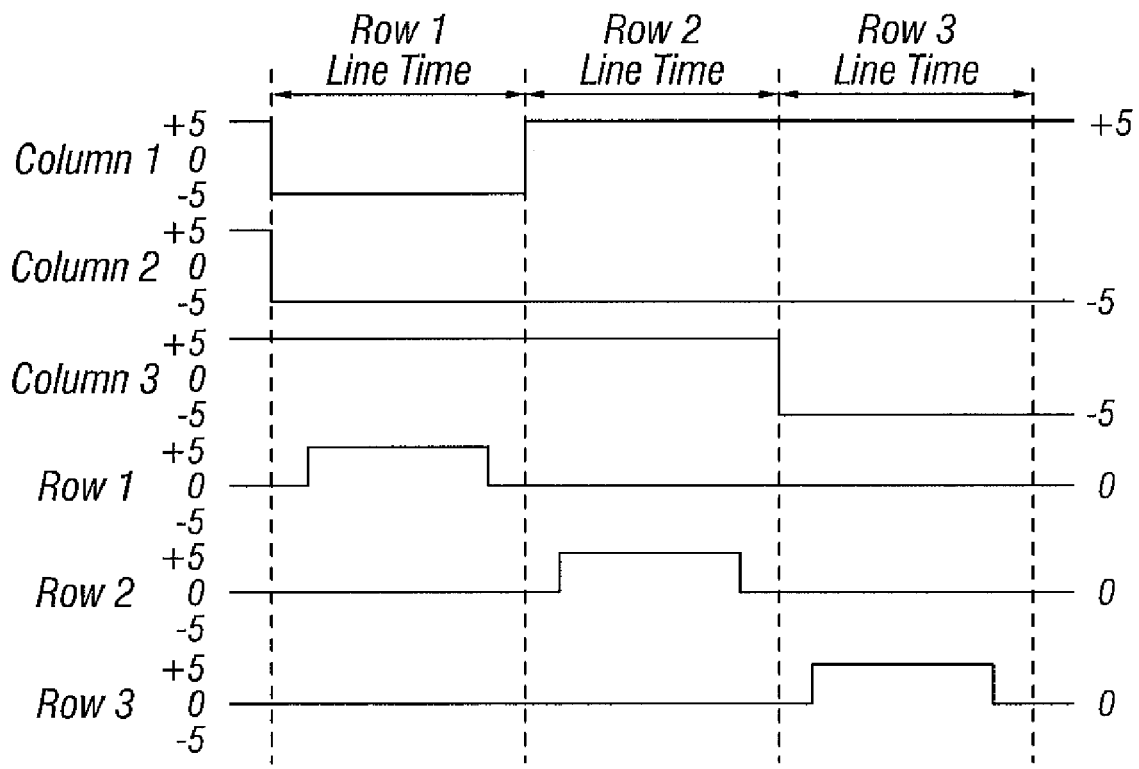
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
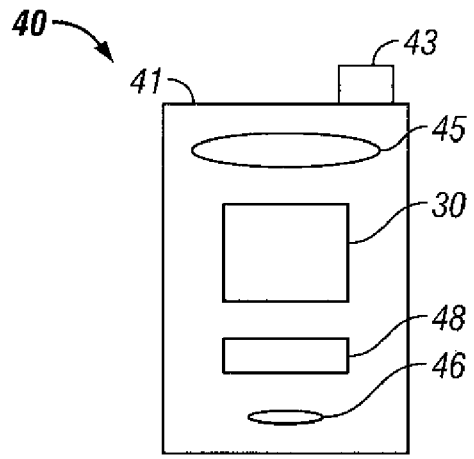
FIGS. 6A and 6B are system block diagrams illustrating an embodiment of a visual display device comprising a plurality of interferometric modulators.
Figure 6B:
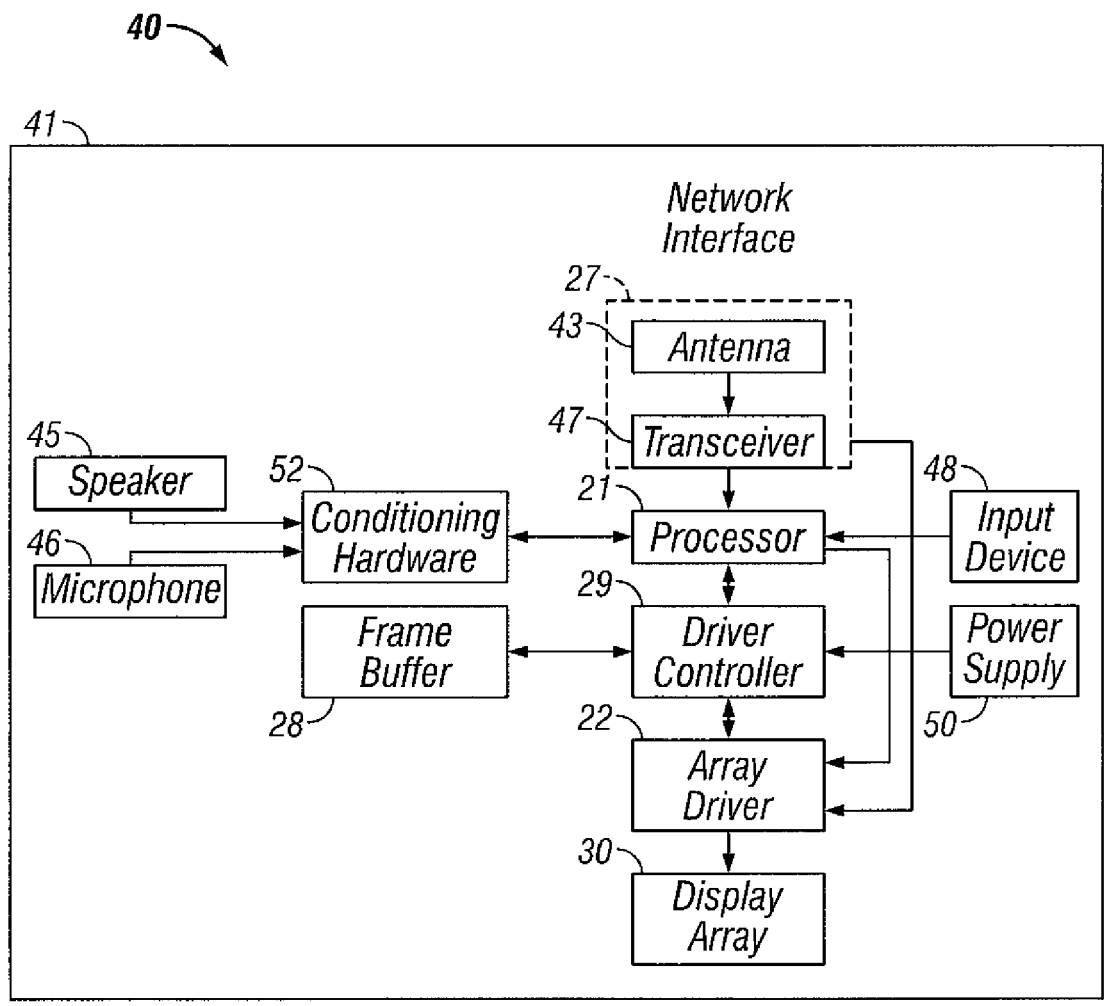

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, the network interface 27 can be replaced by an image source, which can store or generate image data to be sent to the processor 21. For example, the image source can be a digital video disc (DVD) or a hard-disc drive that contains image data, or a software module that generates image data.

The processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, the driver controller 29 is a conventional display controller or a bi-stable display controller (e.g., an interferometric modulator controller). In another embodiment, the array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, the input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

The power supply 50 can include a variety of energy storage devices as are well known in the art. For example, in one embodiment, the power supply 50 is a rechargeable battery, such as a nickel-cadmium battery or a lithium ion battery. In another embodiment, the power supply 50 is a renewable energy source, a capacitor, or a solar cell including a plastic solar cell, and solar-cell paint. In another embodiment, the power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
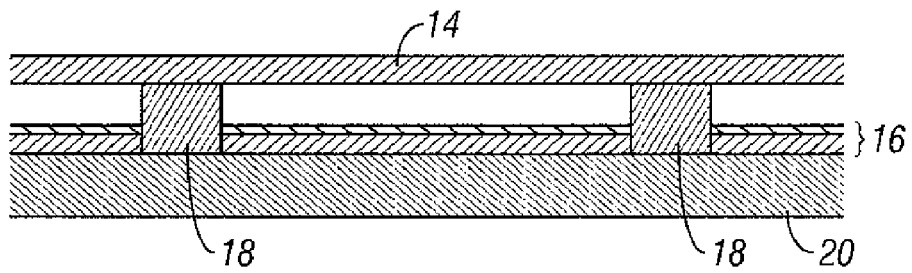
FIG. 7A is a cross section of the device of FIG. 1.
Figure 7B:
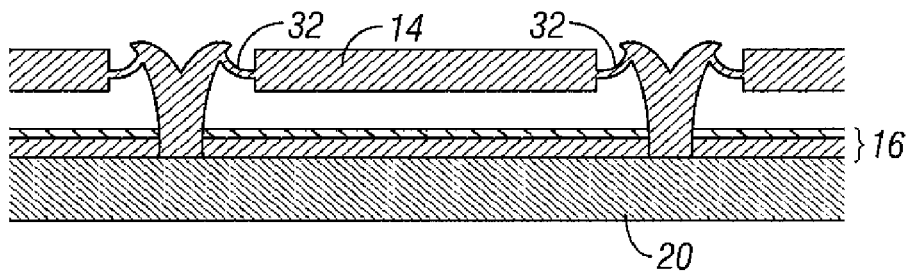
FIG. 7B is a cross section of an alternative embodiment of an interferometric modulator.
Figure 7C:
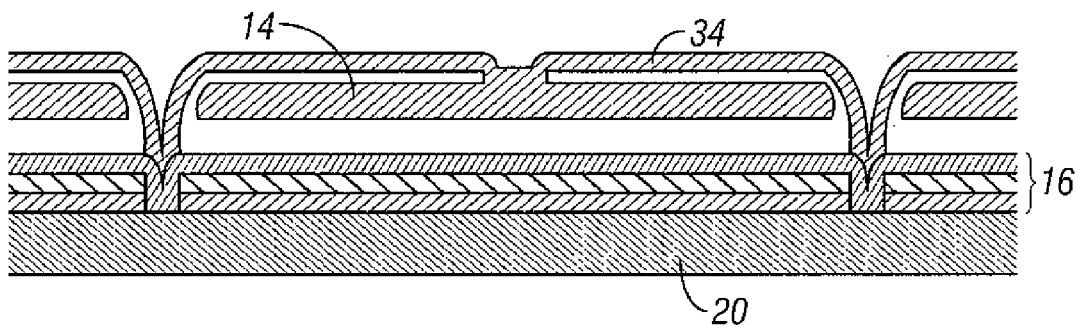
FIG. 7C is a cross section of another alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the movable reflective layer 14 is attached to supports at the corners only, on tethers 32. In FIG. 7C, the movable reflective layer 14 is suspended from a deformable layer 34, which may comprise a flexible metal. The deformable layer 34 connects, directly or indirectly, to the substrate 20 around the perimeter of the deformable layer 34. These connections can take the form of continuous walls and/or individual posts. For example, parallel rails can support crossing rows of deformable layer 34 materials, thus defining columns of pixels in trenches and/or cavities between the rails. Additional support posts within each cavity can serve to stiffen the deformable layer 34 and prevent sagging in the relaxed position.

Figure 7D:
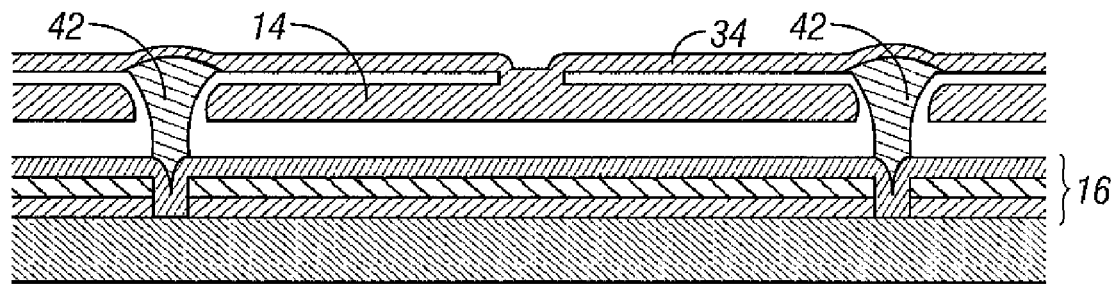
FIG. 7D is a cross section of yet another alternative embodiment of an interferometric modulator.
Figure 7E:
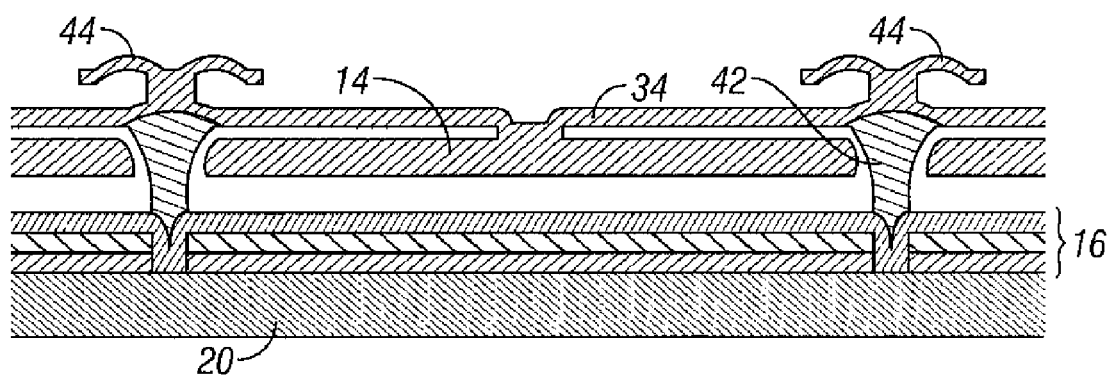
FIG. 7E is a cross section of an additional alternative embodiment of an interferometric modulator.

The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIGS. 7A-7E, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Embodiments of methods for fabricating MEMS comprising one or more cavities or openings, for example, the interferometric modulators ("IMODs") illustrated in FIGS. 7A-7E, are manufactured from precursor devices comprising one or more sacrificial structures comprising a sacrificial material disposed in a location corresponding to the location of the cavity(s) to be formed. The sacrificial structure is then etched away in a release etch to form the cavity(s). Accordingly, these precursor devices are referred to herein as "unreleased." FIGS. 8A and 8B illustrate unreleased versions of the IMODs of FIGS. 7A-7E, wherein like parts are referenced by like reference numbers in the 800 range.

Figure 8A:
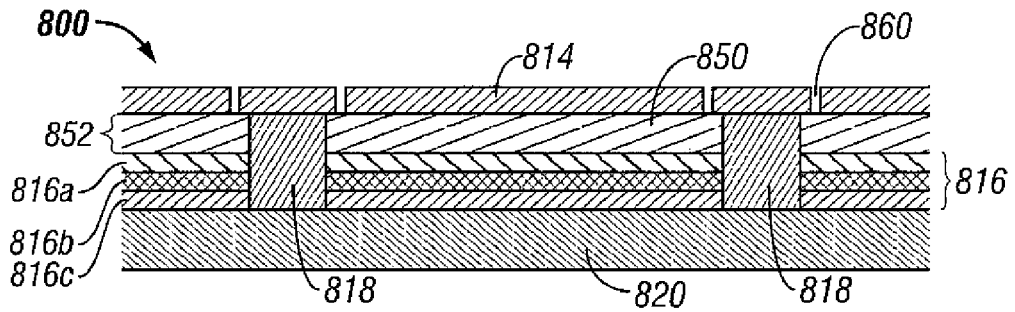
FIG. 8A is a cross section of an unreleased version of the interferometric modulator of FIG. 7A.
Figure 8B:
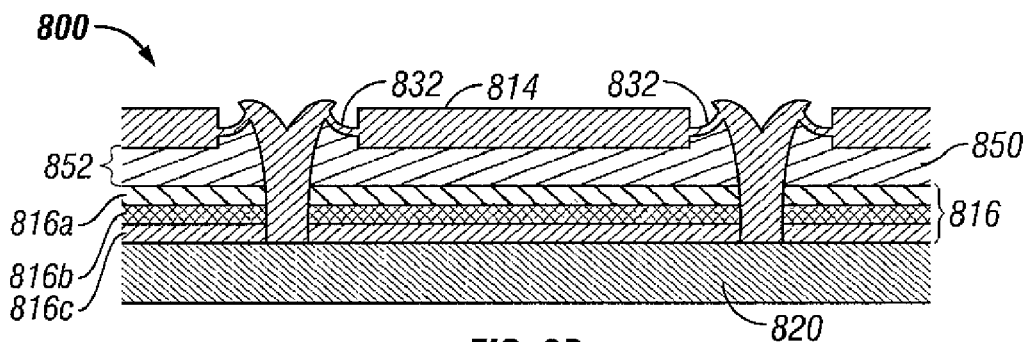
FIG. 8B is a cross section of an unreleased version of the interferometric modulator of FIG. 7B.
Figure 8C:
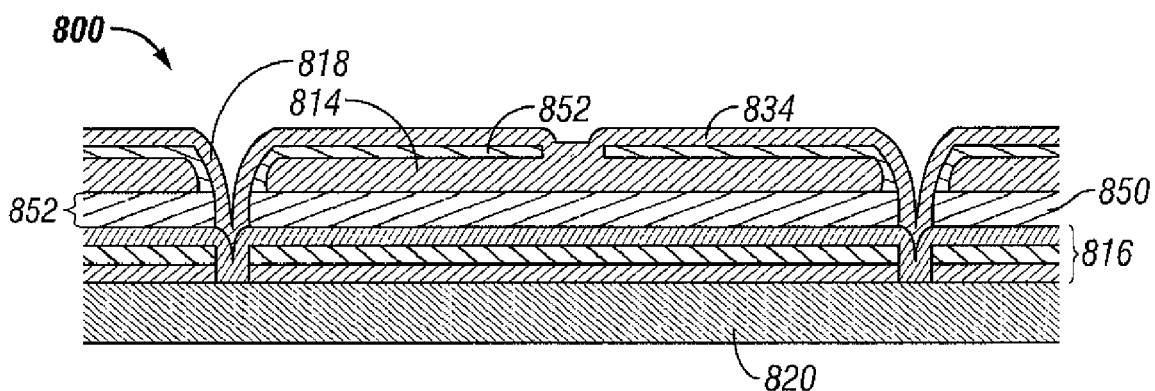
FIG. 8C is a cross section of an unreleased version of the interferometric modulator of FIG. 7C.
Figure 8D:
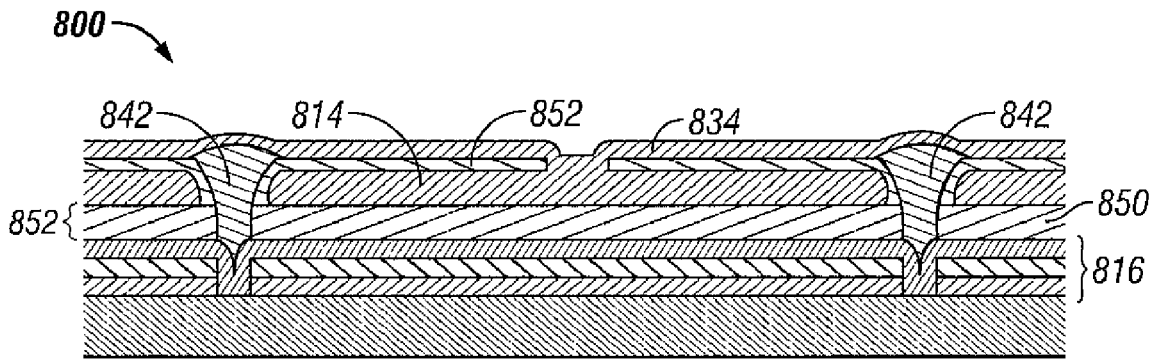
FIG. 8D is a cross section of an unreleased version of the interferometric modulator of FIG. 7D.
Figure 8E:
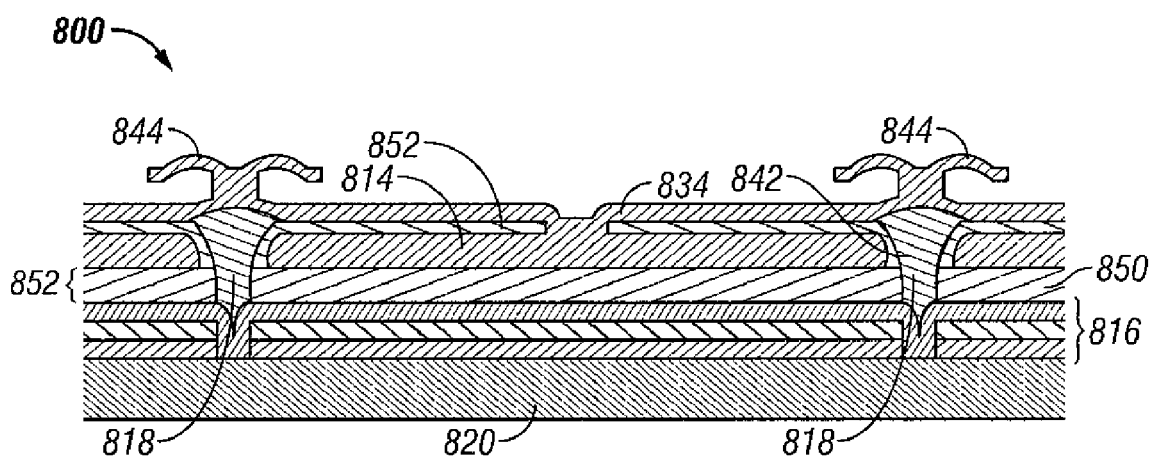
FIG. 8E is a cross section of an unreleased version of the interferometric modulator of FIG. 7E.

For example, FIG. 8A is a side cross section of an embodiment of an unreleased MEMS 800, which after release provides a device similar to the MEMS illustrated in FIG. 7A. The illustrated device 800 comprises a transparent substrate 820, on which is formed an optical stack 816, which in the illustrated embodiment comprises an electrode layer 816c, a partially reflective layer 816b, and a transparent dielectric layer 816a. A sacrificial layer 850 is formed over the optical stack 816, and a movable reflective layer 814 is formed over the sacrificial layer 850. A plurality of etching holes 860 is formed in the movable reflective layer 814. A support structure comprising a plurality of support posts 818 extends between the substrate 820 and the movable reflective layer 814, thereby maintaining the spacing between these components.

The sacrificial layer 850 comprises a sacrificial material that is selected to be etchable using a preselected etchant. The preselected etchant etches the sacrificial material selectively compared with the other materials in the MEMS. In some embodiments, the etchant is a vapor phase etchant, which contacts the sacrificial layer 850 through the etching holes 860, thereby etching away the sacrificial layer 850. In some embodiments, the vapor phase etchant comprises $XeF_2$ and the sacrificial material comprises a material selected from the group of silicon, germanium, titanium, zirconium, hafnium, vanadium, tantalum, niobium, molybdenum, tungsten, and mixtures, alloys, and combinations thereof. In some embodiments, the sacrificial material comprises molybdenum, tungsten, silicon, germanium, or silicon/molybdenum. Release etching the embodiment illustrated in FIG. 8A etches away the sacrificial layer 850, providing the MEMS illustrated in FIG. 7A, in which the sacrificial layer 850 is replaced with an optical cavity that controls in part the interferometric effect by way of the optical pathlength difference between light reflecting off the partial reflector 816b and light passing through the partial reflector, traversing the optical cavity, reflecting from the movable reflector 814 and back to the viewer.

As discussed above, the color of an interferometric modulator in its unactuated state depends on the height of the optical cavity 852, that is, the gap or distance between the movable reflective layer 814 and the optical stack 816, as well as the properties of other components within the optical path, for example, the refractive indices and/or absorption spectra of the components of the optical stack 816. The height of the cavity 852 is set by the thickness of the sacrificial layer 850, the thickness of which is typically well controlled. After the release etch, however, the movable reflective layer 814 is constrained only at the support posts 818 in the illustrated embodiment. Accordingly, in some embodiments, the movable reflective layer 814 is free to assume an equilibrium height different from the thickness of the sacrificial layer 850. The variation can sometimes result in a reflectivity characteristic different than desired, for example, a reflectivity peak or color, and/or a reflectivity peak width or color saturation.

Similar to FIG. 8A, FIGS. 8B-8E are side cross sections of different embodiments of unreleased MEMS devices 800. FIGS. 8B-8E correspond to unreleased versions of the embodiments illustrated in FIGS. 7B-7E, prior to removal of the sacrificial layer 850, and thus prior to forming the optical cavity. As noted, like parts are referred to by like reference numbers in the 800 range.

Figure 9A:
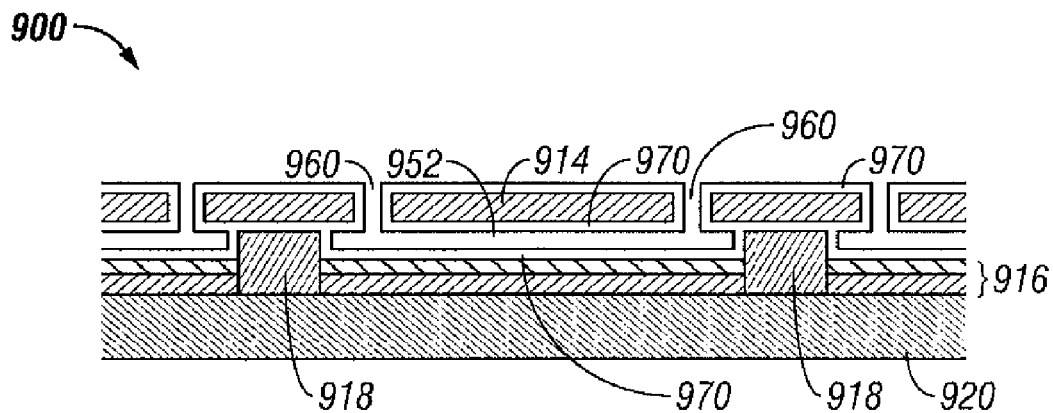
FIG. 9A is a cross section of one embodiment of the interferometric modulator of FIG. 7A after deposition of a reflectivity modifying layer.

Embodiments of structures, methods, and systems permit adjusting or tuning a reflectivity characteristic, for example, the reflectivity peak, of an interferometric modulator after the release etch. FIG. 9A illustrates in cross section an embodiment of an interferometric modulator 900 similar to the embodiment illustrated in FIG. 7A. The device 900 comprises a substrate 920 on which is formed an optical stack 916. A movable reflective layer 914, comprising a plurality of etch holes 960, is spaced from the optical stack 916 by a support structure comprising a plurality of support posts 918, thereby defining a cavity 952. Within the preformed cavity 952 is disposed a reflectivity modifying layer 970, deposited post-release (i.e., after removal of the sacrificial layer 850 of FIG. 8A, which modifies the reflectance spectrum of the device 900 relative to the reflectance spectrum of the device absent the reflectivity modifying layer 970, for example, the embodiment illustrated in FIG. 7A. In the illustrated embodiment, the reflectivity modifying layer 970 forms a substantially conformal layer within the preformed cavity 952 (including the bottom surface of the movable reflective layer 914 and the sides of the support posts 918), on the top surface of the movable reflective layer 914, and on the sides of the etch holes 960. In some embodiments, the reflectivity modifying layer 970 forms on more than one surface but less than all surfaces of the preformed cavity 952, such as for example the movable reflective layer 914 and lower electrode, the movable reflective layer 914 and support posts 918, or the support posts 918 and lower electrode. In other embodiments, the reflectivity modifying layer 970 forms on one surface because a deposition modifying layer (discussed in further detail below) has been applied to all other surfaces.

Figure 9B:
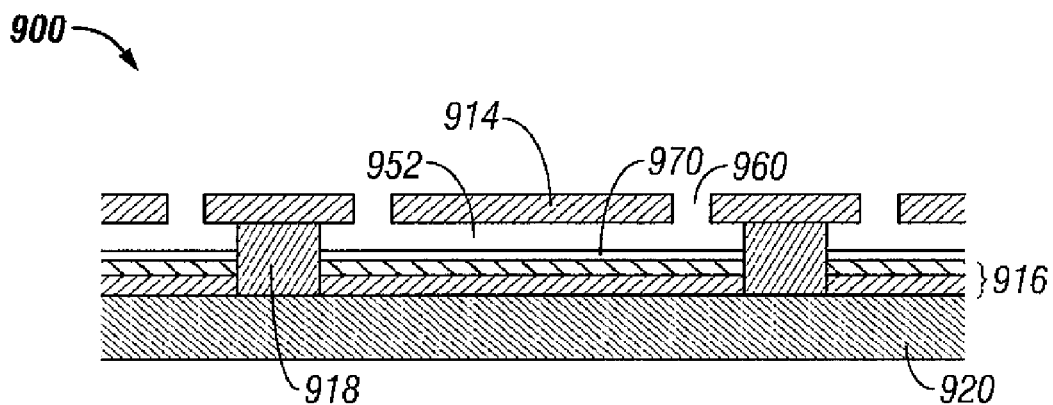
FIG. 9B is a cross section of another embodiment of the interferometric modulator of FIG. 7A after deposition of a reflectivity modifying layer.
Figure 9C:
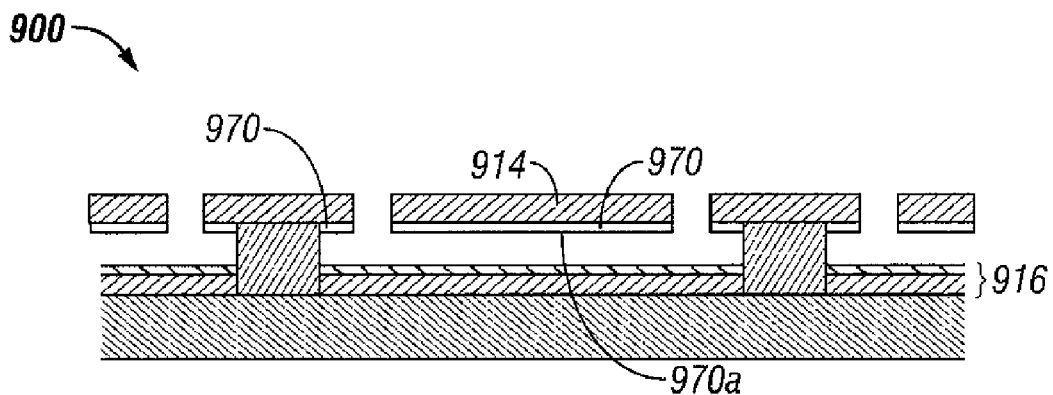
FIG. 9C is a cross section of another embodiment of the interferometric modulator of FIG. 7A after deposition of a reflectivity modifying layer.

FIG. 9B illustrates another embodiment of an interferometric modulator 900 comprising a non-conformal reflectivity modifying layer 970 in the cavity 952. In the illustrated embodiment, the reflectivity modifying layer 970 is disposed substantially only on the optical stack 916. This may be done by applying an inhibitor layer to the exposed surfaces other than the optical stack 916 prior to deposition of the reflectivity modifying layer 970. FIG. 9C illustrates an embodiment in which the reflectivity modifying layer 970 is disposed substantially only on the underside of the movable reflective layer 914. In certain embodiments, the reflectivity modifying layer 970 may be selectively grown on both the top of the optical stack 916 and the bottom of the movable reflective layer 914, but not on the sides of the support posts 918, the sides of the etch holes 960, or the top of the movable reflective layer 914. Those skilled in the art will understand that other embodiments use other arrangements, for example, a layer that is thicker on the optical stack and thinner on the movable reflective layer, or the converse.

The reflectivity modifying layer 970 can modify a reflectivity spectrum of a MEMS device through one or more mechanisms. In a "shifting" mechanism, the reflectivity modifying layer 970 adjusts, tunes, or modifies a reflectivity spectrum of the device, for example, by changing the effective height or thickness of the optical cavity 952 or air gap. In some embodiments, the shape of the reflectivity spectrum is substantially unchanged, the adjustment is in the wavelength of the reflectivity peak of the spectrum. The material or materials used therefor are referred to herein as "shifting materials." The height of the air gap 952 is determined by the height or thickness of the sacrificial layer 850 (FIG. 8A). After the release etch, however, the movable reflective layer 914 may assume a different equilibrium position, thereby changing the location of the reflectivity peak or color of the interferometric modulator 900. Both the change in the effective height or thickness of the optical cavity 952 due to the deposition of the reflectivity modifying layer 970 and the release of the movable reflective layer 914 may contribute to the change in reflectivity characteristics, such as reflectance, color saturation, reflectivity peak, and reflectivity peak width. In one embodiment, the reflectivity modifying layer modifies the first reflectivity spectrum to produce a second reflectivity spectrum. The initial, or first, reflectivity spectrum may correspond to a first interferometrically enhanced color. The modified, or second, reflectivity spectrum may correspond to a second interferometrically enhanced reflected color. The first interferometrically enhanced color may differ from the second interferometrically enhanced color. Put another way, the primary peak of the modified or second spectrum differs from the primary peak of the first spectrum. In another embodiment, the material deposited in the optical cavity 952 of the released interferometric modulator absorbs a significant portion of the reflectance spectrum, thereby improving the interferometric modulator's color saturation. In certain embodiments, the interferometric modulator enhances reflections of a subset of visible wavelengths, such as for example from about 400 nm to about 500 nm, to produce a particular color, such as blue.

In embodiments in which the reflectivity modifying layer 970 has a positive dielectric constant, the reflectivity peak shifts to a longer wavelength. The mechanism for this shift in the reflectivity peak is referred to herein as a "red shifting" mechanism because the reflectivity spectrum is shifted towards longer wavelengths, such as red for embodiments in the visible spectrum. In other embodiments in which the reflectivity modifying layer 970 has a negative dielectric constant, such as metals, the reflectivity peak shifts to a shorter wavelength, such as blue for embodiments in the visible spectrum. In certain embodiments, the reflectivity modifying layer 970 comprising metals, such as copper, gold, silver, ruthenium, aluminum, titanium, molybdenum, may be deposited on the reflective layer 816a. The terms "red shift" and "blue shift" may be used for IMODs operating in the visible spectrum, but it will be understood that other embodiments can shift to longer or shorter wavelengths outside the visible spectrum. For convenience, the terms "red shifting" and "blue shifting" are employed to indicate a direction of change, without limiting to the visible spectrum.

Figure 10A:
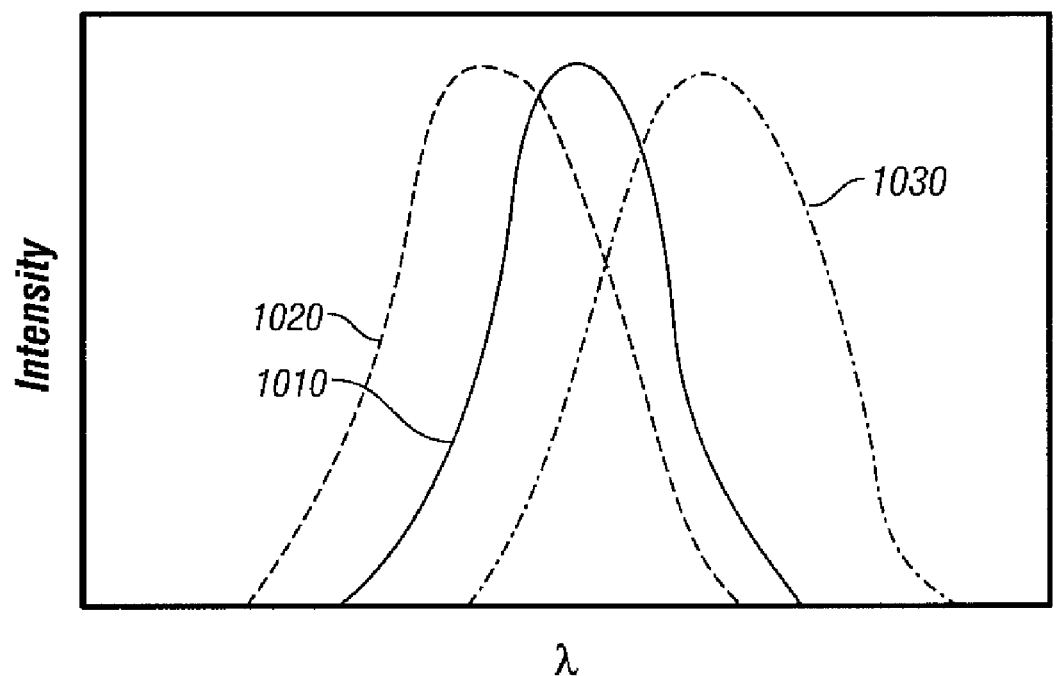
FIG. 10A illustrates the reflectivity spectrum of an interferometric modulator after shifting due to the reflectivity modifying layer.

As schematically illustrated in FIG. 10A, a reflectivity spectrum 1010 of an unadjusted interferometric modulator or IMOD is red shifted to provide an adjusted reflectivity spectrum 1030 for the interferometric modulator after forming a red shifting reflectivity modifying layer 970 therein. Accordingly, even in embodiments in which the reflectivity modifying layer 970 is substantially colorless, the reflectivity modifying layer 970 produces a red shift in the wavelength of the reflectivity peak. Those skilled in the art will understand that in embodiments in which the reflectivity modifying layer 970 is disposed over both the optical stack 916 and the movable reflective layer 914 (e.g., FIG. 9A), both portions of the reflectivity modifying layer 970 contribute to a red shift in the reflectivity peak.

In other embodiments, the reflectivity modifying layer 970 comprises a reflective surface 970a and is disposed on a bottom surface of the movable reflective layer 914, for example, as illustrated in FIG. 9C. In these embodiments, the reflectivity modifying layer 970 decreases the height of the air gap 952 by the thickness of the reflectivity modifying layer 970. In the illustrated embodiment, the reflective surface 970a is the surface of the reflectivity modifying layer 970 proximal to the optical stack 916. As schematically illustrated in FIG. 10A, a reflectivity spectrum 1010 of an unadjusted interferometric modulator is blue shifted to provide an adjusted reflectivity spectrum 1020 for the interferometric modulator after forming a blue shifting reflectivity modifying layer 970 therein.

Figure 10B:
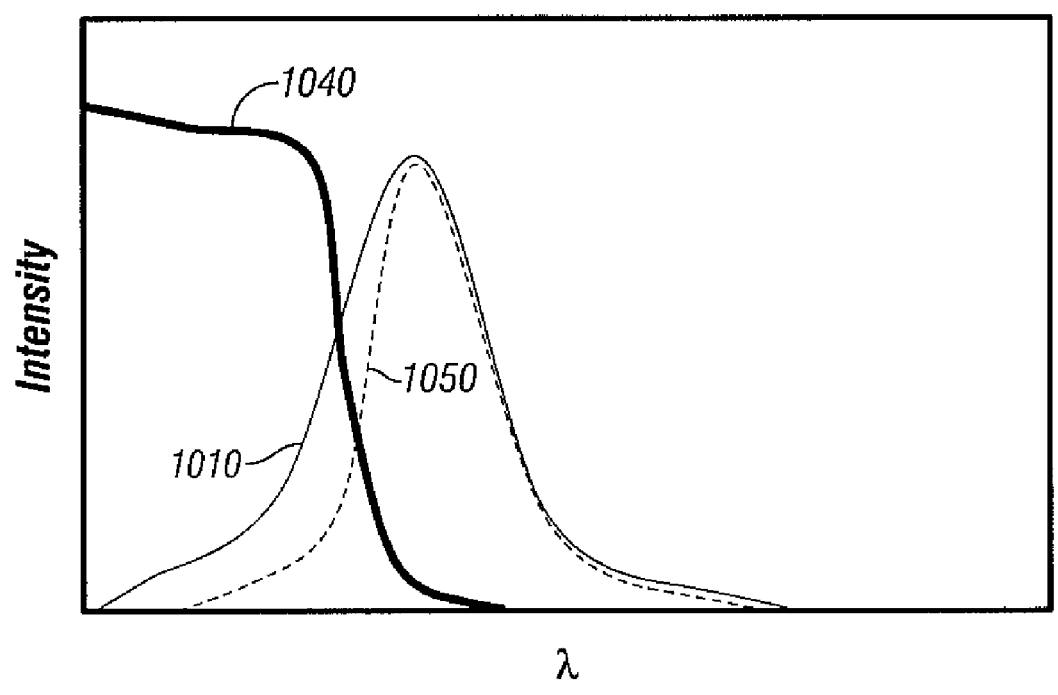
FIG. 10B illustrates the reflectivity spectrum of an interferometric modulator after trimming or modifying the reflectivity spectrum by way of the reflectivity modifying layer.

In a "trimming" mechanism, the reflectivity modifying layer 970 comprises one or more materials with a sufficient absorbance at one or more selected wavelengths to adjust, tune, and/or modify a shape of a reflectivity spectrum of the device 900, for example to narrow and/or reshape the reflectivity peak, a process also referred to as "trimming." The material or materials used therefor are referred to herein as "trimming materials." Trimming materials may include silicon, such as amorphous or nanocrystalline silicon (Si), Ge, GaAs, GaN, ZnS, and CdSe, which when deposited in thin layers are capable of being tailored to absorb the desired wavelengths of the spectrum at issue. Trimming is schematically illustrated in FIG. 10B, which illustrates a reflectivity spectrum 1010 of an unadjusted interferometric modulator, an absorption spectrum 1040 of the reflectivity modifying layer, and a resulting reflectivity spectrum 1050 for the adjusted interferometric modulator. Trimming may be used to change a width of a reflectivity peak and/or a shape of a reflectivity spectrum. In some embodiments, trimming can modify the color of an interferometric modulator either towards red or blue if the original spectrum peak 1010 is sufficiently broad such that the peak covers multiple colors. For example, using a trimming material that absorbs a tail of a broad reflectivity spectrum of the device can shift the color toward the opposite end of the spectrum. As will be appreciated from the merely narrowed curve of FIG. 10B, however, the peak (and thus color) has not been shifted in the illustrated example; rather, the color of the interferometric modulator is more saturated in the resulting reflectivity spectrum 1050 than in the original reflectivity spectrum 1010. Those skilled in the art will understand that the shape of the spectrum is modified in other ways in other embodiments, for example, using one or more trimming materials with desired absorptions, thereby adjusting the reflectivity spectrum at a plurality of wavelengths. Those skilled in the art will understand that a shifting mechanism is also operative in embodiments of the trimming mechanism in which the optical path passes through the trimming material, that is, the trimming material is not opaque.

The reflectivity modifying layer 970 comprises one or more layers each of which can independently be a shifting material and/or trimming material. In some embodiments, reflectivity modifying layer 970 is optically thin, for example, with an overall thickness of <λ/4, for example, less than about 200 nm, less than about 100 nm, less than about 50 nm, less than about 20 nm, or less than about 10 nm, where λ is from about 400 nm to about 800 nm for an optical modulator for visible light. In some embodiments, the reflectivity modifying layer 970 is, for example, from about 0.5 nm to about 10 nm thick, from about 1 nm to about 5 nm thick, and/or less than about 5 nm thick. In some embodiments, the reflectivity modifying layer 970 has a refractive index of between about 1.3 and about 6. In other embodiments, the refractive index is greater than about 1.7. For example, the reflectivity modifying layer 970 may include GaN (with a refractive index of about 2.3); ZnS (with a refractive index of about 2.4); Ge (with a refractive index of about 5.4 at 632 nm); and Si (with a refractive index of about 3.9 at 632 nm)

In other embodiments, the thickness of the reflectivity modifying layer 970 is about λ/4 (quarter wave), thereby changing the interferometric properties of the device 900.

The reflectivity modifying layer 970 comprises one or more suitable materials known in the art, for example, dielectric materials, metals, dyes, semiconductors, and combinations thereof. Suitable dielectric materials include alumina ($Al_2O_3$), silica ($SiO_2$), titania ($TiO_2$), zirconia ($ZrO_2$), hafnia ($HfO_2$), $In_2O_3$, $SnO_2$, ZnO, and combinations thereof, which are optionally doped. In some embodiments, the dielectric material is substantially optically transparent. Suitable metals include copper, gold, silver, ruthenium, combinations thereof, and the like. In some embodiments, the metal comprises nanoparticles and/or nanolayers exhibiting a suitable plasmon resonance, which are useful as trimming materials. Suitable dyes include organic dyes, one or more of which may be selected to provide nearly any desired absorbance spectrum. Embodiments of suitable semiconductors useful as trimming materials include, for example, nano-crystalline silicon, Ge, GaAs, GaN, ZnS, CdSe, and the like. Those skilled in the art will understand that the optical properties of certain materials will depend on one or more physical dimensions of the material, for example, thickness, diameter, spacing, and the like.

Figure 11:
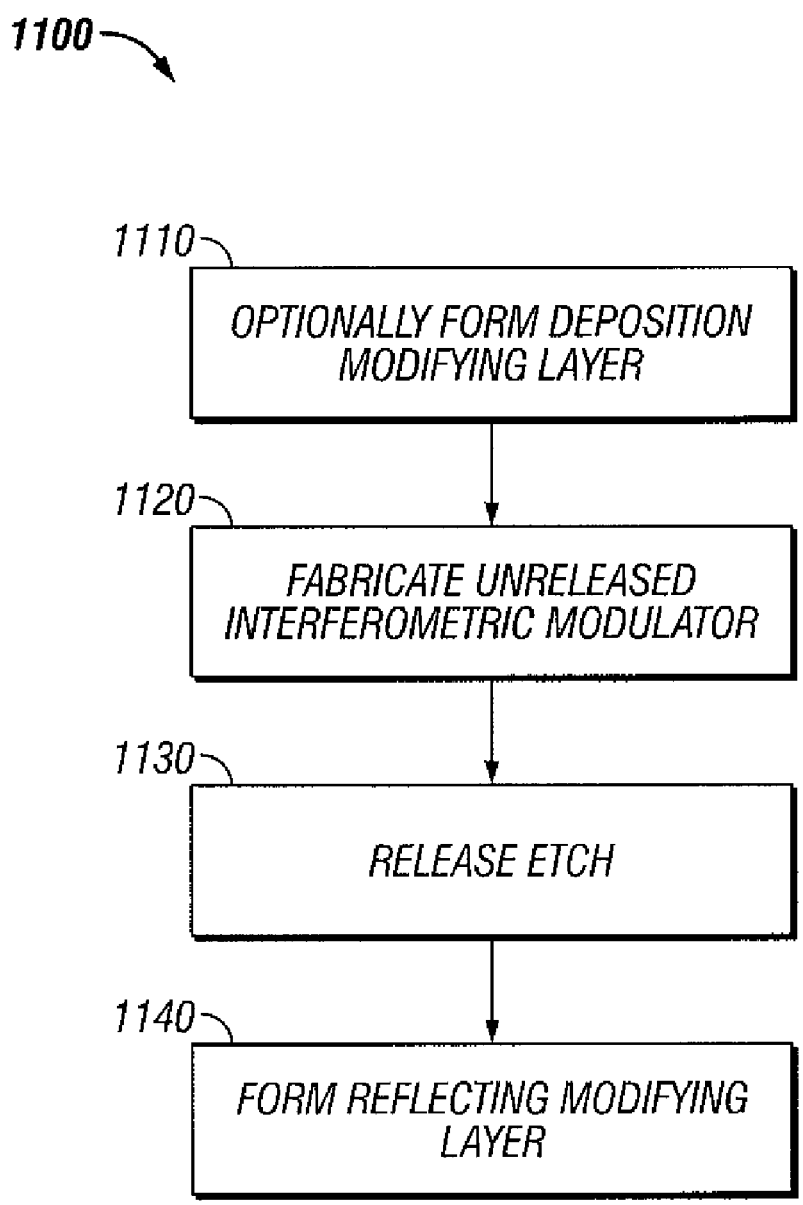
FIG. 11 schematically illustrates an embodiment of a method for adjusting a reflectivity characteristic of an interferometric modulator.

FIG. 11 schematically illustrates an embodiment of a method 1100 for adjusting a reflectivity characteristic of an interferometric modulator. The method is described with reference to embodiments of MEMS illustrated in FIGS. 12A-12B, although those skilled in the art will understand that the method is applicable to optical electromechanical devices with other designs, including the interferometric modulators illustrated in FIGS. 7A-7E. The selective deposition in preformed cavities is described herein by use of deposition modifying layers and/or selective irradiation (see below) prior to the selective deposition of reflectivity modifying layers for interferometric modulators. More generally, such post-release deposition selectivity as taught herein can be applied after forming cavities of optical electromechanical systems, more particularly of optical microelectromechanical systems (MEMS) devices such as optical switches, digital micromirror devices (DMD) or digital light processing (DLP) devices, optical filters, optical sensors, and other optical electromechanical devices.

Figure 12A:
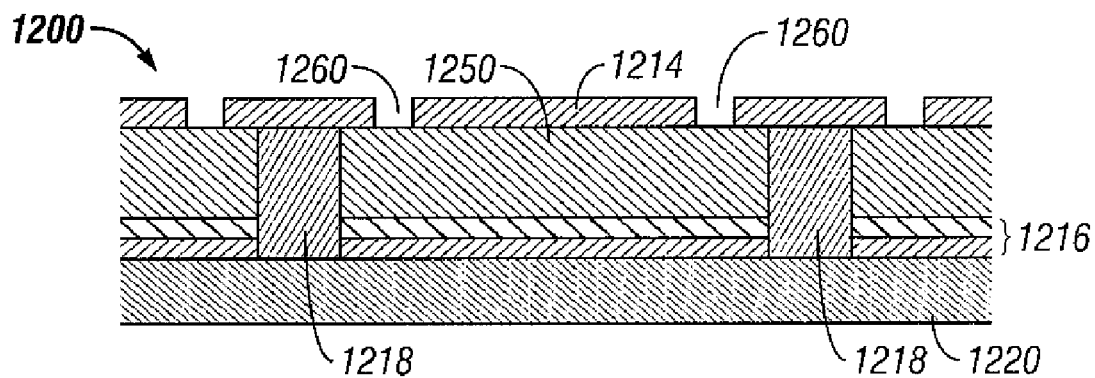
FIG. 12A is a cross section of an embodiment of an unreleased interferometric modulator similar to that of FIG. 8A.
Figure 12B:
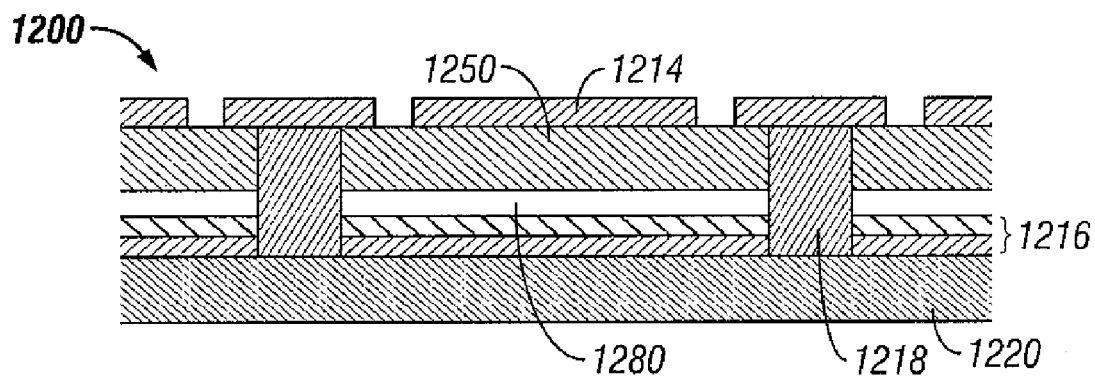
FIG. 12B is a cross section of one embodiment of an embodiment of an unreleased interferometric modulator with a deposition modifying layer formed prior to the sacrificial layer.
Figure 12C:
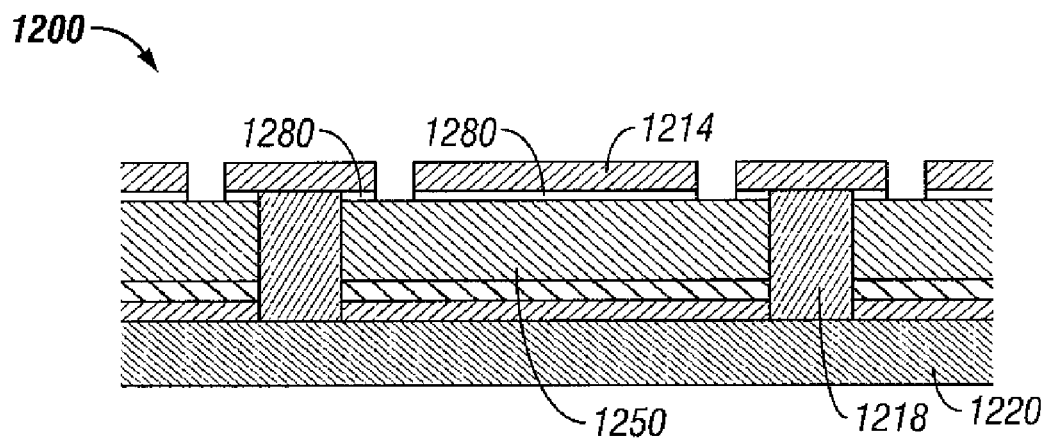
FIG. 12C is a cross section of another embodiment of the interferometric modulator with a deposition modifying layer formed after the sacrificial layer.

In optional step 1110, one or more deposition modifying layers 1280 are formed in the unreleased interferometric modulator 1200. While shown prior to fabrication 1120 of the unreleased MEMS, in fact the deposition modifying layer is formed as part of the process of fabrication 1120 of the unreleased MEMS. FIG. 12B illustrates an embodiment in which a deposition modifying layer 1280 is formed over the optical stack 1216 prior to depositing a sacrificial layer 1250. FIG. 12C illustrates an embodiment in which a deposition modifying layer 1280 is formed between the sacrificial layer 1260 and the movable reflective layer 1214. Other embodiments include deposition modifying layers in other locations, such as over the movable reflective layer and/or along side surfaces of support structures. Embodiments of deposition modifying layers 1280 promote or inhibit deposition of a reflectivity modifying layer thereon to limit the locations of post-release formation, as shown in FIGS. 9B and 9C and as discussed in greater detail below. Embodiments of deposition modifying layers are relatively thin compared with the reflectivity modifying layer to be formed.

In step 1120, an unreleased interferometric modulator is fabricated by micromachining processes known in the art, for example, thin film deposition and patterning, such as by masking and etching. FIG. 12A illustrates an embodiment of an unreleased interferometric modulator 1200, which is similar to the embodiment illustrated in FIG. 8A and described above. Briefly, the unreleased interferometric modulator 1200 comprises a substrate 1220, an optical stack 1216 formed on the substrate 1220, a sacrificial layer 1250 formed over the optical stack 1216, and a movable reflective layer 1214 formed over the sacrificial layer 1250. A support structure comprising support posts 1218 extend between the substrate 1220 and the movable reflective layer 1214. A plurality of etching holes 1260 is formed in the movable reflective layer 1214.

In step 1130 the sacrificial layer 1250 is etched away in a release etch, thereby forming a cavity 1252 in the released interferometric modulator 1200, as described above. In embodiments comprising one or more deposition modifying layers 1280, the deposition modifying layers 1280 are substantially not etched away in the release etch. In other embodiments, a portion of the deposition modifying layer(s) 1180 is completely etched away, for example, in embodiments, in which a reflectivity modifying layer is disposed over only a portion of a surface. In some embodiments, the deposition modifying layer is etched in a separate step. In the embodiment illustrated in FIG. 12B, the deposition modifying layer 1280 remains disposed on the optical stack 1216 after the release etch. In the embodiment illustrated in FIG. 12D, a deposition modifying layer 1280 remains disposed on the movable reflective layer 1214 after the release etch.

In step 1140, a reflectivity modifying layer 1270 is formed in the cavity 1252. Precursor materials that form the reflectivity modifying layer 1270 access the cavity 1252 through etch holes 1260, at edges of the interferometric modulator, and/or through spaces between adjacent interferometric modulators. In the embodiment illustrated in FIG. 12E, the reflectivity modifying layer 1270 is formed substantially conformally within and outside the cavity 1252, corresponding to the unreleased IMOD 1200 of FIG. 12A.

Figure 12D:
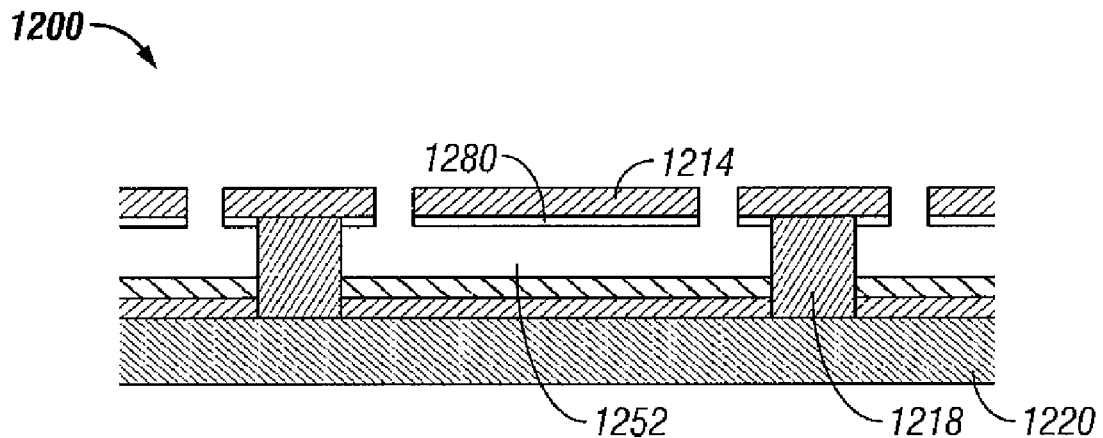
FIG. 12D is a cross section of another embodiment of the interferometric modulator of FIG. 12C after the release etch.
Figure 12E:
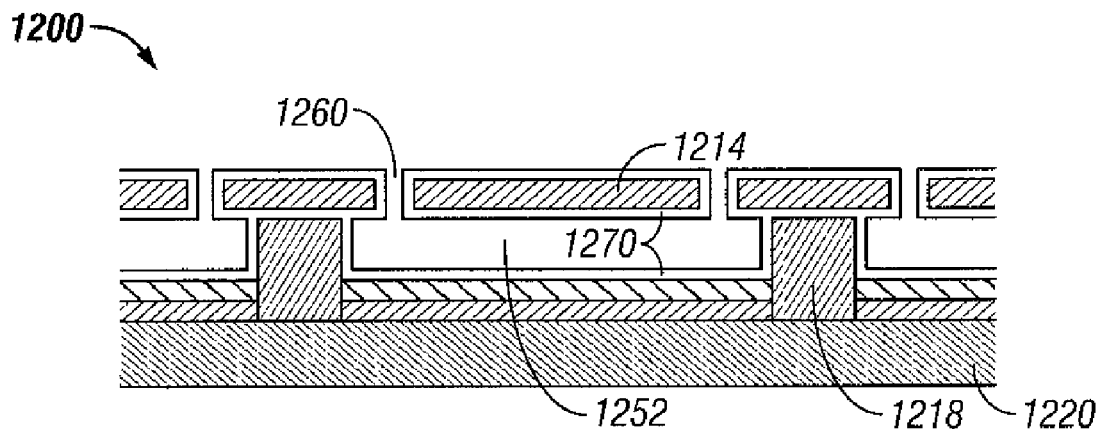
FIG. 12E is a cross section of another embodiment of the interferometric modulator of FIG. 12A after a release and subsequent deposition of a reflectivity modifying layer.
Figure 12F:
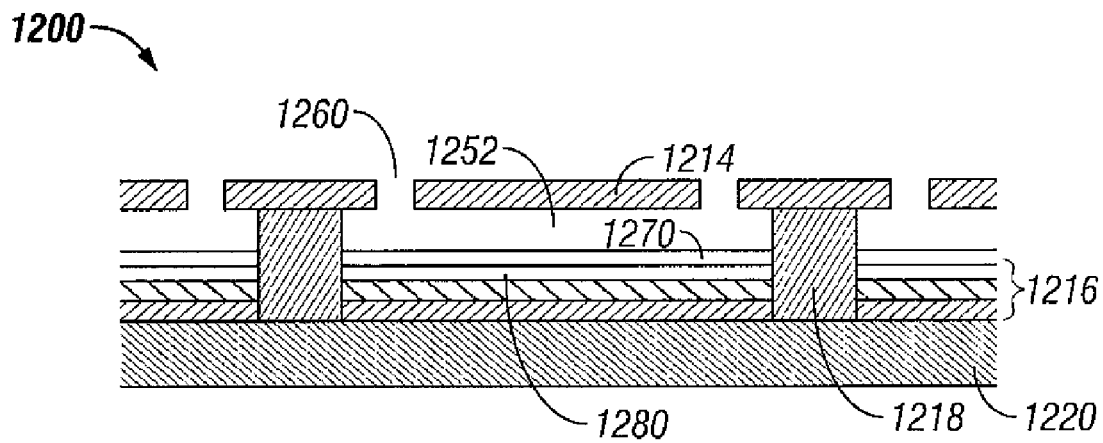
FIG. 12F is a cross section of another embodiment of the interferometric modulator of FIG. 12B after the deposition of the reflectivity modifying layer preferentially on the deposition modifying layer.

In the embodiment illustrated in FIG. 12F, corresponding to the unreleased IMOD of FIG. 12B, the reflectivity modifying layer 1270 is formed preferentially (i.e., at a greater rate) over a deposition modifying layer 1280, which is disposed on the optical stack 1216, compared to surfaces without the deposition modifying layer 1280. In some embodiments, layers of the reflectivity modifying material are formed over other surfaces of the cavity that are thinner compared with the reflectivity modifying layer 1270 formed over the deposition modifying layer 1280 (not illustrated) and can be removed by timed isotropic etches. In the embodiment illustrated in FIG. 12F, the deposition modifying layer 1280 promotes deposition of the reflectivity modifying layer 1270 thereover.

Figure 12G:
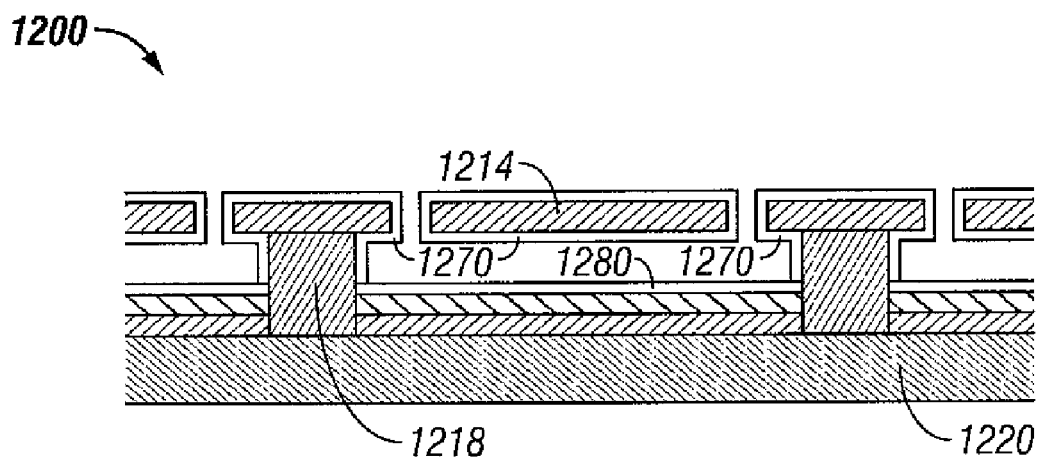
FIG. 12G is a cross section of another embodiment of the interferometric modulator of FIG. 12B after the deposition of the reflectivity modifying layer preferentially on surfaces other than the deposition modifying layer.

In contrast, in the embodiment illustrated in FIG. 12G, corresponding to the unreleased IMOD 1200 of FIG. 12B, a deposition modifying layer 1280 disposed on the optical stack 1216, inhibits formation of the reflectivity modifying layer 1270 thereover. Consequently, the reflectivity modifying layer 1270 is preferentially formed over the surfaces of the cavity 1252 other than the deposition modifying layer 1280, for example, over surfaces of the movable reflective layer 1214 and support posts 1218. Those skilled in the art will understand that deposition modifying layers may be disposed within the cavity on either or both of the optical stack and the movable reflective layer in other embodiments.

While not shown, it will be understood that the deposition modifying layer 1280 of FIGS. 12C and 12D can be selected to either encourage or inhibit deposition of the subsequently deposited reflectivity modifying layer.

The reflectivity modifying layer 1270 is formed by any suitable method known in the art where surface-initiated film growth is achieved, for example, by chemical vapor deposition (CVD) or atomic layer deposition (ALD) type of processes. In some embodiments, the reflectivity modifying layer 1270 is formed by an ALD-type process. Briefly, a layer or film of a material deposited or grown by ALD is formed one molecular layer of the material at a time through sequential reactions between a surface and pulses of at least a first precursor gas and a second reactant gas. The first precursor gas is the source of a first element of the ALD-deposited material, and the second reactant gas can be the source of a second element of the ALD-deposited material or can prepare the surface left by the prior pulse for further reaction. In a typical process, pulses of the first precursor gas contact a surface comprising functional groups with which the first precursor gas reacts (e.g., chemisorbs), thereby forming a first surface layer comprising the first element. The first surface layer is self-passivating with respect to the first precursor gas. Consequently, excess first precursor gas does not react with the first surface layer (e.g., the chemisorbed layer includes ligands that prevent further chemisorption beyond a monolayer or submonolayer), and as such, the reaction is self-limiting. Excess first precursor gas is then typically purged. The first surface layer is then contacted with pulses of a second reactant gas, with which it reacts to form a second surface layer that does not further react with the second reactant gas. Consequently, this step is also self-limiting. Excess second reactant gas is then typically purged. The second surface layer is reactive with the first precursor gas, however. Consequently, sequentially contacting the surface with the first precursor gas and the second reactant gas permits a user to deposit a layer of the desired thickness. To keep the deposition self-limiting to less than a monolayer per cycle, the reactants are kept spatially separate, e.g., by temporal pulsing and purging, or other removal of excess reactant and byproduct(s) between pulses. Numerous variations of this simplified example can use additional pulses in all or some cycles, simultaneous provision of multiple reactants, use of ligand-stripping pulses between precursor reactants, etc.

Embodiments of ALD permits fine control of thickness of the deposited layer because the layer grows by the thickness of less than or equal to a molecular layer of the deposited material in each deposition cycle. For example, monolayers of $Al_2O_3$ are from about 3 Å to about 5 Å thick, and in some embodiments, are grown as about 1 Å thick sub-monolayers in each deposition cycle (on average). Embodiments of ALD exhibit uniformity of thickness over a deposited area, for example, not greater than about 1% variation. Some embodiments exhibit 100% step coverage (SC) of surface features. The composition of the deposited layer is controllable by periodic substitution or additions of different reactants, permitting the manufacture of laminated and/or complex compound layers. Embodiments of ALD are performed at low temperatures, for example, about from about 80° C. to about 500° C., more typically, about from about 100° C. to about 400° C., and often at less than about 350° C.

Suitable materials for a reflectivity modifying layer 1170 that are depositable by ALD include $Al_2O_3$, $SiO_2$, $SiO_2/Al_2O_3$ laminates, titania ($TiO_2$), zirconia ($ZrO_2$), hafnia ($HfO_2$), $In_2O_3$, $SnO_2$, ZnO, and combinations thereof. Suitable source gases are known in the art. For example, precursor gases for $Al_2O_3$ include trimethyl aluminum (TMA) as the precursor gas, and at least one of water ($H_2O$) and ozone ($O_3$) as the reactant gases. Suitable source gases for $SiO_2$ include trimethylsilane and $O_3/O_2$; $SiH_2Cl_2$ and $O_3$; $SiCl_4$ and $H_2O_2$; and $CH_3OSi(NCO)_3$ and $H_2O_2$. $SiO_2/Al_2O_3$ laminates are suitably deposited by catalytic ALD using, for example, trimethyl aluminum (TMA) and tris(t-butoxy)silanol. Those skilled in the art will understand that in some embodiments, ALD will deposit a layer on all exposed surfaces of the device 1200, for example, the top surface of the movable reflective layer 1214, as in the embodiment of FIG. 12E.

A number of suitable chemical vapor deposition (CVD) techniques may be used to deposit dyes, metals, and semiconductors onto the MEMS device post-release. The CVD technique is chosen to produce a conformal thin film coating of the particular material, often through a low pressure process. Suitable metals may include for example aluminum, titanium, and molybdenum. By adding more metal to the reflector membrane and reducing the gap, a person skilled in the art would understand that light reflected from the MEMS device may blue shift. In some embodiments, silicon can also be deposited by a conformal CVD process to produce silicon capable of absorbing visible light and therefore trimming the spectrum. For example, GaAs, a compound semiconductor, deposited on the MEMS device, helps to tailor the absorption in the visible spectrum.

Suitable materials for a deposition modifying layer will depend on factors including the nature of the material used in the reflectivity modifying layer, the method by which the reflectivity modifying layer is formed, and whether the deposition modifying layer promotes or inhibits deposition.

Figure 13:
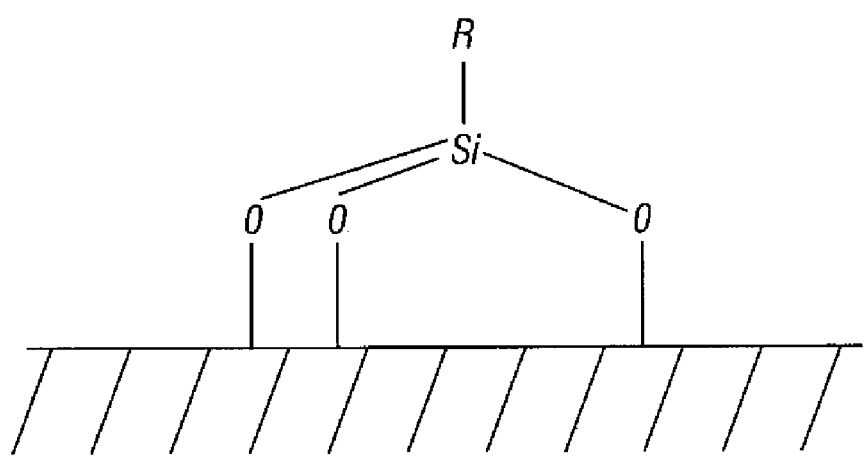
FIG. 13 schematically illustrates one embodiment of a reflectivity modifying layer bonded to a substrate surface.

For example, where the reflectivity modifying layer is formed by ALD, some embodiments of deposition-inhibiting reflectivity modifying layers include hydrophobic layers, including self-assembled hydrophobic layers. FIG. 13 illustrates one non-limiting example of an alkylsiloxane orthoester hydrophobic layer, which is bonded to an underlying surface through free hydroxyl groups. In this case, the hydrophobic layer is bonded to the underlying surface through three oxygen-silicon bonds. In other embodiments, other bond structures may be used within the scope of this invention. The alkyl group (R) is straight-chained, branched, and/or cyclic. Another example of an alkylsiloxane hydrophobic layer is formed from the precursor hexamethyl disilazane (HMDS), which does not form long carbon chains, but does produce a hydrophobic —O—$Si(CH_3)_3$ surface layer.

In some embodiments, R is a long-chained normal alkyl group, for example, comprising from about 8 to about 30 carbon atoms. In some embodiments, the alkyl group is partially or completely fluorinated. Other suitable hydrophobic layers (not shown) include hydrophobic polymers, for example, fluoropolymers, which are formed by any suitable method. In some embodiments, suitable fluoropolymers are deposited by reactive ion etching (RIE) using suitable precursors, for example, $HCF_3$ or $CF_4+H_2$. In other embodiments, a hydrophobic layer is formed by treating the surface with $HSiF_3$.

Suitable deposition modifying layers that promote or enhance ALD include layers that catalyze ALD, for example, layers that promote chemisorption of a precursor gas. In some embodiments, such layers are hydrophilic. For example, in some embodiments, the layer comprises an organosilicon compound with one or more chemical functional groups such as alcohols, amines, or carboxylic acids, for example, as illustrated in FIG. 13, where R is the organic moiety with specified chemical functionality.

Those skilled in the art will understand that the extent of the modification of deposition on a deposition modifying layer will depend on factors including the composition of the deposition modifying layer, the particular source gases (where the deposition is by ALD), the degree of coverage of the deposition modifying layer on the underlying surface, deposition conditions, and the like. Moreover, the composition and/or coverage of deposition modifying layers in different color interferometric modulators, which corresponds to different heights of cavity, for example, red, green, and blue, are controllable in the fabrication of the interferometric modulators. Accordingly, each color is separately adjustable or tunable in some embodiments, for example, by using different or no deposition modifying layers 1280 in some colors, and/or by varying the coverage of the deposition modifying layer 1280 between the colors.

The deposition modifying layer(s) are formed using any suitable method known in the art, which will depend on the particular material(s) used in therein. Suitable methods include one or more of coating, depositing, patterning, etching, planarizing, and post-deposition modification. For example, in some embodiment, a material for a deposition modifying layer or a precursor thereof is deposited over an underlying layer by at least one of physical vapor deposition (PVD) or sputtering; by chemical vapor deposition (CVD); by atomic layer deposition (ALD); by spin coating; and the like. In some embodiments, the material is patterned and etched, thereby providing a patterned deposition modifying layer, which selectively inhibits or promotes deposition of a reflectivity modifying layer thereon, applications of which are described below. For example, in some embodiments, a patterned deposition modifying layer comprises a region that selectively inhibits deposition, a region that selectively promotes deposition, a region that neither inhibits nor promotes deposition, and combinations thereof. Those skilled in the art will understand that methods for etching a particular material as well as suitable masks for patterning thereof will depend on the particular material-to-be-patterned, as well as the other materials present in the interferometric modular. Similarly, suitable post-deposition modifications also depend on the particular material-to-be-modified.

Another method for selectively enhancing or inhibiting deposition of a layer in a cavity of an optical electromechanical device, such as reflectivity modifying layer in interferometric modulators of a particular color, is to irradiate the interferometric modulator with a wavelength of light (e.g., visible spectrum) that is selectively absorbed by the interferometric modulator, for example, at or near the reflectivity peak of the interferometric modulator. The interferometric modulator absorbs the light, thereby generating heat, which accelerates or interferes with certain reactions for depositing a reflectivity modifying layer. Because interferometric modulators of the target color preferentially absorb the light, this method is useful in targeting selected interferometric modulators in an array comprising interferometric modulators of different colors. Selectivity is achieved in this example by selective light absorption of certain colors and the irradiation itself need not be selective. In some embodiments, an individual or small group of interferometric modulators is selected, for example, by targeted irradiation with a suitable laser, for example, a laser of a suitable color and/or an infrared laser. Selective irradiation can be achieve in this example by targeting exposure of only select interferometric modulators to a scanning laser and the relative light absorptiveness of different interferometric modulators need not be different. Those skilled in the art will understand that irradiation is combined with deposition modifying layers in some embodiments. For example, a laser of a selected wavelength can target heat generation at a particular electromechanical device or type of device in an array, such as a particular colored pixel of a released multicolor IMOD array, which in turn can lead to selective growth of either the reflectivity modifying layer or a deposition modifying layer at the pixels of the targeted color. Furthermore, the heat will be selectively concentrated on the absorber in the optical stack, facilitating selective layer formation on the optical stack (see, e.g., FIG. 9B).

Figure 14A:
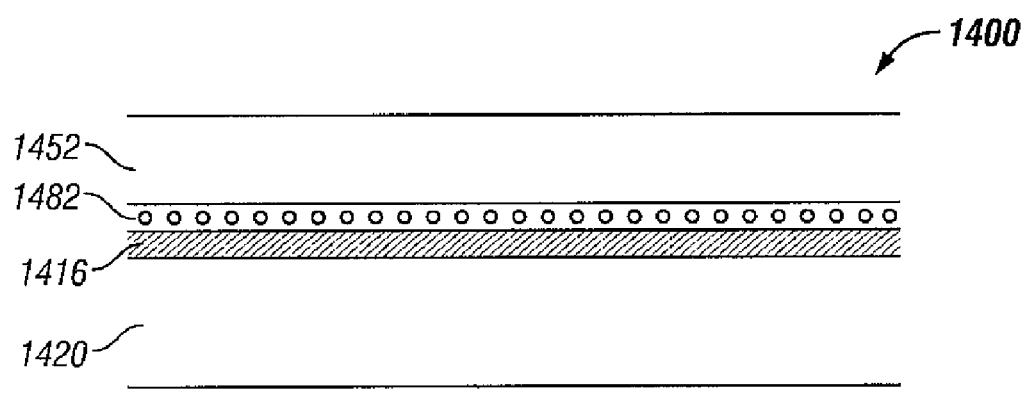
FIG. 14A illustrates one step in a process flow to produce an interferometric modulator according to one embodiment of the present invention.
Figure 14B:
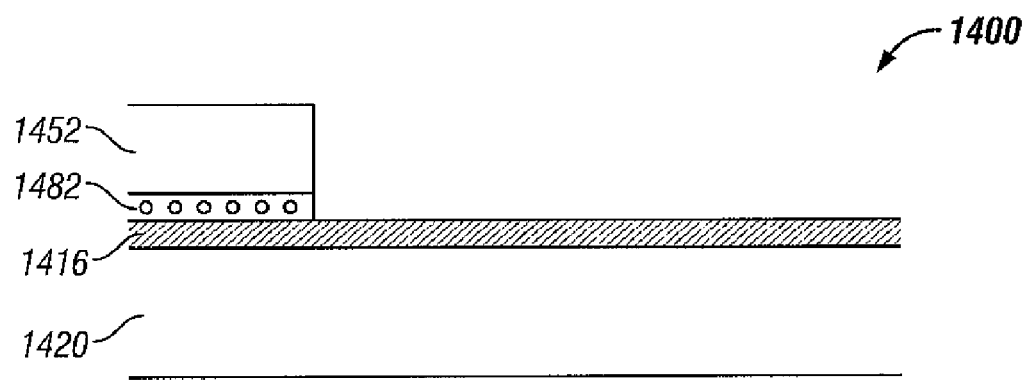
FIG. 14B illustrates another step in the process flow of FIG. 14A to produce an interferometric modulator according to one embodiment of the present invention.
Figure 14C:
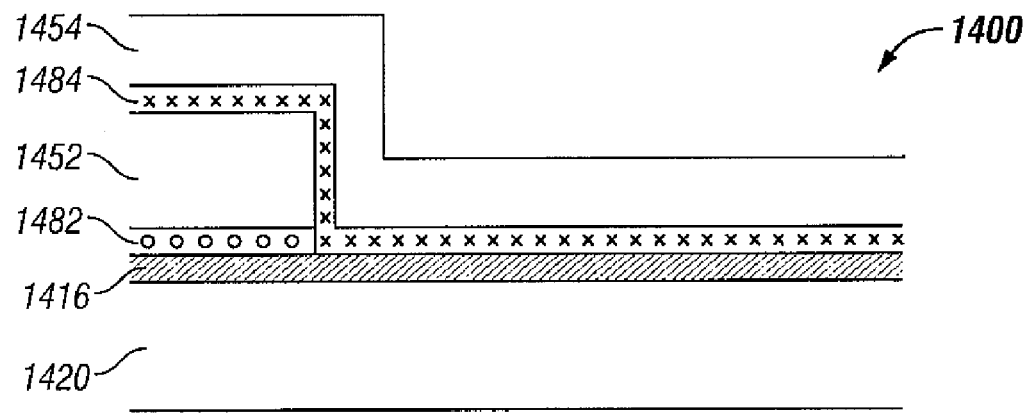
FIG. 14C illustrates another step in the process flow of FIG. 14B to produce an interferometric modulator according to one embodiment of the present invention.
Figure 14D:
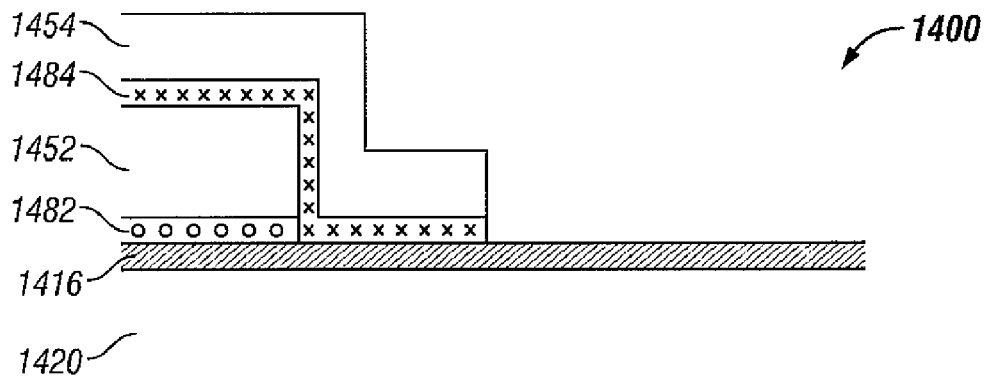
FIG. 14D illustrates another step in the process flow of FIG. 14C to produce an interferometric modulator according to one embodiment of the present invention.
Figure 14E:
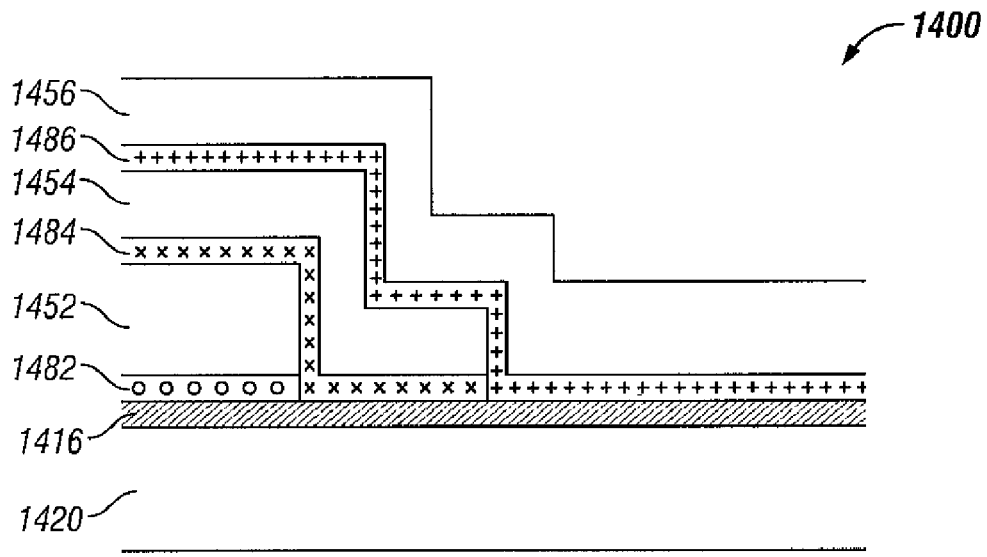
FIG. 14E illustrates another step in the process flow of FIG. 14D to produce an interferometric modulator according to one embodiment of the present invention.
Figure 14F:
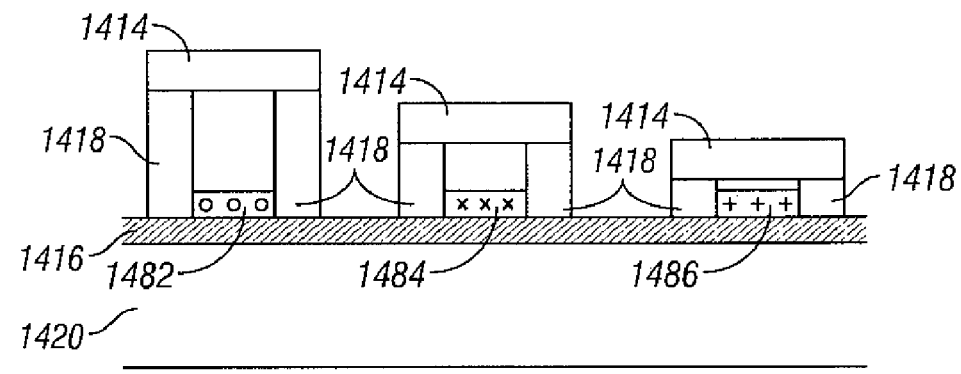
FIG. 14F illustrates another step in the process flow of FIG. 14E to produce an interferometric modulator according to one embodiment of the present invention.

FIGS. 14A-14F illustrate an embodiment of a method for forming any combination of different deposition modifying layers in each color of an array of interferometric modulators. FIG. 14A illustrates in cross section of a structure 1400 comprising a substrate 1420 on which is formed an optical stack 1416. A first deposition modifying layer 1482 and a first sacrificial layer 1452 are formed on the optical stack. FIG. 14B illustrates the structure 1400 after a portion of the first sacrificial layer 1452 and first deposition modifying layer 1482 have been etched away, thereby exposing a portion the optical stack 1416. As shown in FIG. 14C, a second deposition modifying layer 1484 and a second sacrificial layer 1454 are then deposited over the exposed portion of the optical stack 1416 and the remaining portion of the first sacrificial layer 1452. In FIG. 14D, a portion of the second sacrificial layer 1454 and second deposition modifying layer 1484 are etched away. A third deposition modifying layer 1486 and third sacrificial layer 1456 are deposited analogously to the second deposition modifying layer 1484 and second sacrificial layer 1454 to form the structure illustrated in FIG. 14E. Support posts 1418 are formed and a movable reflective layer 1414 formed over the third sacrificial layer 1458, and the device 1400 is release etched as described above to provide the structure illustrated in FIG. 14F with three different cavity sizes and three different deposition modifying layers 1482, 1484, 1486 for the differently colored pixels. Excess deposition modifying layers 1482, 1484, and 1486 may be removed during the release or sacrificial etch by lift-off. These different deposition modifying layers can then be used to form tailored reflectivity modifying layers thereover after release. In some cases, the deposition modifying layer will inhibit deposition thereover so that type of pixel will not receive a reflectivity modifying layer.

In some embodiments, all of the interferometric modulators of a particular color in an array are intentionally manufactured bluer or redder than the desired final color and their color is corrected for example, using one of the shift mechanisms, by depositing one or more layers of a reflectivity modifying or shifting material within the cavity. In some embodiments, all of the interferometric modulators in an array are intentionally manufactured bluer or redder, and each color is selectively adjusted as described above. In other embodiments, all of the interferometric modulators are intentionally manufactured bluer or redder and are adjusted non-selectively. In some embodiments, all of the interferometric modulators of a first color are manufactured bluer and all of the interferometric modulators of a second color are manufactured redder, and the first and second colors are each separately adjusted post-etching as described above. Those skilled in the art will understand that some embodiments use a trimming material for the reflectivity modifying layer, which adjusts the shape of the reflectivity spectrum rather than shifting the peak. It will also be understood that shifting, as described herein, primarily shifts the peak but may also have slight effects on the shape of the curve. Trimming will be readily understood, in view of the disclosure herein, to have substantial effect on the shape of the curve (see, e.g., FIG. 10B). In certain embodiments, trimming will reduce the area under the reflectivity curve by at least about 1% to about 5%.

In some embodiments, all of the interferometric modulators in an array are manufactured with a single color (monochromatic display), for example, blue. Other colors, for example, green and red, are then formed from subsets of the single color interferometric modulators after the release etch, for example, by red-shifting the reflectivity spectra of selected interferometric modulators to provide the desired colors. In other embodiments, the initial array comprises all red interferometric modulators and selected interferometric modulators are adjusted to provide green and blue interferometric modulators. Other embodiments initially comprise interferometric modulators of two different colors and selected interferometric modulators of one or both colors are adjusted as described above.

Those skilled in the art will understand that changes in the apparatus and manufacturing process described above are possible, for example, adding and/or removing components and/or steps, and/or changing their orders. For example, while FIGS. 12B and 12C show deposition modifying layers 1280 on the optical stack 1216 and underside of the mirror 1214, respectively, FIGS. 12F and 12G show reflectivity modifying layers 1270 only on two variants of the deposition modifying (inhibiting or encouraging) layer 1280 of FIG. 12B. The skilled artisan will readily appreciate where the reflectivity modifying layer would be formed over the deposition modifying (inhibiting or encouraging) layer 1280 of FIG. 12C, and furthermore that the layer 1280 can additionally or alternatively be formed on side surfaces of supports 1218 and upper surfaces of the movable layer 1214. Moreover, the methods, structures, and systems described herein are useful for fabricating other electronic devices, including other types of MEMS devices, for example, other types of optical modulators.

Moreover, while the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

We claim:

1. An optical display system comprising an array of interferometric modulators, each interferometric modulator comprising:
    a substrate;
    an optical stack formed on the substrate;
    a movable reflective layer, wherein the movable reflective layer has a plurality of etch holes;
    support posts extending between the substrate and the movable reflective layer;
    a cavity defined by the space between the movable reflective layer and the optical stack; and
    a reflectivity modifying layer disposed on at least one surface defining the cavity of at least one but fewer than all interferometric modulators in the array, wherein the cavity and optical stack of the at least one interferometric modulator without the reflectivity modifying layer have a first reflectance spectrum with a first reflectivity peak and the cavity and optical stack of the at least one interferometric modulator with the reflectivity modifying layer have a second reflectance spectrum with a second reflectivity peak.

2. The optical display system of claim 1, wherein the reflectivity modifying layer forms a substantially conformal layer within the cavity.

3. The optical display system of claim 1, wherein the cavity and optical stack without the reflectively modifying layer is larger than the cavity and optical stack with the reflectivity modifying layer.

4. The optical display system of claim 1, wherein the reflectivity modifying layer is between about 0.5 nm and about 10 nm thick.

5. The optical display system of claim 1, wherein the reflectivity modifying layer comprises more than one layer, wherein each layer comprises a different material.

6. The optical display system of claim 1, wherein the reflectivity modifying layer comprises an organic dye.

7. The optical display system of claim 1, wherein the reflectivity modifying layer forms substantially on at least one of the optical stack, the bottom of the movable reflective layer, the sides of the support posts, the sides of the etch holes, and the top of the movable reflective layer.

8. The optical display system of claim 7, wherein the reflectivity modifying layer on the optical stack is thicker than the reflectivity modifying layer on the top or bottom of the movable reflective layer.

9. The optical display system of claim 7, wherein the reflectivity modifying layer on the optical stack is thinner than the reflectivity modifying layer on the top or bottom of the movable reflective layer.

10. The optical display system of claim 1, wherein the first reflectivity peak is shifted relative to a wavelength position of the second reflectivity peak.

11. The optical display system of claim 10, wherein the reflectivity modifying layer has a positive dielectric constant and the first reflectivity peak corresponds to a shorter wavelength than the second reflectivity peak.

12. The optical display system of claim 10, wherein the reflectivity modifying layer has a negative dielectric constant and the first reflectivity peak corresponds to a longer wavelength than the second reflectivity peak.

13. The optical display system of claim 1, wherein the reflectivity modifying layer comprises metal.

14. The optical display system of claim 13, wherein the metal is chosen from a group consisting of aluminum, titanium, molybdenum, copper, gold, silver, ruthenium, and combinations thereof.

15. The optical display system of claim 1, wherein the reflectivity modifying layer comprises a material capable of absorbing one or more selected wavelengths in the visible spectrum to modify the shape of the first reflectivity spectrum to produce the second reflectivity peak.

16. The optical display system of claim 15, wherein the material comprises a semiconductor chosen from the group consisting of Si, Ge, GaAs, ZnS, and CdSe.

17. The optical display system of claim 15, wherein first reflectivity spectrum corresponds to a first interferometrically enhanced reflected color, the second reflectivity spectrum corresponds to a second interferometrically enhanced reflected color, and the first color differs from the second color.

18. The optical display system of claim 1, wherein the reflectivity modifying layer comprises a dielectric layer is chosen from a group consisting of alumina ($Al_2O_3$), silica ($SiO_2$), titania ($TiO_2$), zirconia ($ZrO_2$), hafnia ($HfO_2$), $In_2O_3$, $SnO_2$, ZnO and combinations thereof.

19. The optical display system of claim 18, wherein the dielectric material is optically transparent.

20. The optical display system of claim 1, further comprising:
   a display;
   a processor that is configured to communicate with said display, said processor being configured to process image data; and
   a memory device that is configured to communicate with said processor.

21. The optical display system of claim 20, further comprising:
   an image source module configured to send said image data to said processor.

* * * * *